United States Patent
Kajihara et al.

(10) Patent No.: US 12,479,757 B2
(45) Date of Patent: Nov. 25, 2025

(54) CRYSTALLIZED GLASS, HIGH-FREQUENCY SUBSTRATE, AND METHOD FOR MANUFACTURING CRYSTALLIZED GLASS

(71) Applicant: AGC Inc., Tokyo (JP)

(72) Inventors: Takato Kajihara, Tokyo (JP); Hiroyuki Hijiya, Tokyo (JP); Tomonori Ogawa, Tokyo (JP); Kosho Akatsuka, Tokyo (JP)

(73) Assignee: AGC Inc., Tokyo (JP)

( * ) Notice: Subject to any disclaimer, the term of this patent is extended or adjusted under 35 U.S.C. 154(b) by 437 days.

(21) Appl. No.: 17/936,146

(22) Filed: Sep. 28, 2022

(65) Prior Publication Data
US 2023/0034469 A1 Feb. 2, 2023

Related U.S. Application Data

(63) Continuation of application No. PCT/JP2021/002924, filed on Jan. 27, 2021.

(30) Foreign Application Priority Data

Mar. 30, 2020 (JP) ................... 2020-060908

(51) Int. Cl.
*C03C 10/00* (2006.01)
*C03B 32/02* (2006.01)
*C03C 4/16* (2006.01)

(52) U.S. Cl.
CPC ............. *C03C 10/00* (2013.01); *C03B 32/02* (2013.01); *C03C 4/16* (2013.01); *C03C 2204/00* (2013.01); *Y10T 428/24273* (2015.01)

(58) Field of Classification Search
CPC ....... C03C 10/00; C03C 4/16; C03C 2204/00; C03C 3/0036; C03C 3/0085;
(Continued)

(56) References Cited

U.S. PATENT DOCUMENTS 3,467,534 A * 9/1969 Macdowell ......... C03C 10/0009
501/63
6,407,020 B1 6/2002 Ohkawa et al.
(Continued)

FOREIGN PATENT DOCUMENTS

JP 2004-345950 A 12/2004
JP 2012-250903 A 12/2012
(Continued)

OTHER PUBLICATIONS

Rowlands. Nucleation and Crystal Growth in the Lithia-baria-Silica System. University of Sheffield, Ceramics, Glasses and Polymers. 1976 (Year: 1976).*

(Continued)

*Primary Examiner* — Matthew E. Hoban
(74) *Attorney, Agent, or Firm* — Oblon, McClelland, Maier & Neustadt, L.L.P.

(57) ABSTRACT

The present invention relates to a crystallized glass including a crystalline phase consisting of Ba—Si—O, in which the crystallized glass includes Li, and crystallinity of Li-based crystals contained in the crystalline phase is 20% or lower as represented by weight %, a high-frequency substrate including the crystallized glass, and a manufacturing method for a crystallized glass including a crystalline phase consisting of Ba—Si—O, the method including: obtaining an amorphous glass by melt-shaping a material containing BaO and $SiO_2$; and crystallizing the amorphous glass by holding the amorphous glass at a treatment temperature of 600° C. or higher and lower than 1,000° C.

19 Claims, 5 Drawing Sheets

(58) Field of Classification Search
CPC ....... C03C 10/0009; C03C 8/24; C03B 32/02; Y10T 428/24273
See application file for complete search history.

(56) References Cited

U.S. PATENT DOCUMENTS

| | | | |
|---|---|---|---|
| 2005/0255984 A1 | 11/2005 | Ota et al. | |
| 2005/0288167 A1* | 12/2005 | Miyauchi | H01L 23/15 257/E23.009 |
| 2011/0200909 A1 | 8/2011 | Parihar et al. | |
| 2018/0044244 A1* | 2/2018 | Sugimoto | C03C 3/089 |

FOREIGN PATENT DOCUMENTS

| | | |
|---|---|---|
| JP | 2013-516378 A | 5/2013 |
| JP | 2015-78089 A | 4/2015 |
| JP | 2018-180331 A | 11/2018 |
| WO | WO 2005/028388 A1 | 3/2005 |

OTHER PUBLICATIONS

Sigma Aldrich. Certificate of Analysis "Barium carbonate 99.98% trace metals basis". Retrieved from https://www.sigmaaldrich.com/certificates/sapfs/PROD/sap/certificate_pdfs/COFA/Q14/329436-BULK0000343433.pdf on Apr. 2, 2025. (Year: 2025).*

International Search Report issued Apr. 6, 2021 in PCT/JP2021/002924 filed Jan. 27, 2021, 6 pages.

Ohsato, H. et al., "Millimeter-Wave Dielectric Properties of Cordierite/Indialite Glass Ceramics," Japanese Journal of Applied Physics, 50, 2011, 6 pages.

* cited by examiner

CRYSTALLIZED GLASS, HIGH-FREQUENCY SUBSTRATE, AND METHOD FOR MANUFACTURING CRYSTALLIZED GLASS

CROSS-REFERENCE TO RELATED APPLICATIONS

This is a continuation of International Application No. PCT/JP2021/002924 filed on Jan. 27, 2021, and claims priority from Japanese Patent Application No. 2020-060908 filed on Mar. 30, 2020, the entire content of which is incorporated herein by reference.

TECHNICAL FIELD

The present invention relates to a crystallized glass, a high-frequency substrate using crystallized glass, and a manufacturing method thereof.

BACKGROUND ART

In recent years, radio transmission using a microwave band or a millimeter-wave band have come to attract attention as a large volume transmission technology. However, as a frequency band used becomes broader and signal frequencies become higher resultantly, a problem arises that the dielectric loss of high-frequency devices increases. As a result, dielectric substrates that are low in dielectric loss have come to be required. A material of such a dielectric substrate is selected from, for example, quartz, ceramic, glass, etc. Among various kinds of glass, crystallized glass obtained by crystallizing a part of glass has advantageous over quartz and ceramic in that it can be shaped more easily and manufactured at a lower cost and its dielectric loss can be made smaller. The examples of low-loss crystallized glass include indialite/cordierite crystallized glass as disclosed in Non-patent document 1.

CITATION LIST

Non-Patent Literature

Non-patent document 1: H. Ohsato, J. S. Kim, A. Y. Kim, C. I. Cheon, and K. W. Chae, "Millimeter Wave Dielectric Properties of Cordierite/Indialite Glass Ceramics," Jpn. J. Appl. Phys., 50 (2011) 09NF01 1 5.

SUMMARY OF INVENTION

Technical Problem

However, in the crystallized glass disclosed in Non-patent document 1, it is necessary to perform crystallization treatment at as high a temperature as higher than 1,200° C.

Based on the above background, an object of the present invention is to provide crystallized glass that can be fired at a low temperature.

Solution to Problem

The present invention provides a crystallized glass including a crystalline phase consisting of Ba—Si—O.

The present invention provides a high-frequency substrate including the crystallized glass.

The present invention provides a manufacturing method for a crystallized glass including a crystalline phase consisting of Ba—Si—O, the method including: obtaining an amorphous glass by melt-shaping a material containing $Li_2O$, BaO and $SiO_2$, and crystallizing the amorphous glass by holding the amorphous glass at a treatment temperature of 600° C. or higher and lower than 1,000° C.

Advantageous Effects of Invention

According to the present invention, the crystallized glass that can be fired at a low temperature and a high-frequency substrate including the crystallized glass can be obtained.

DESCRIPTION OF EMBODIMENTS

<Crystallized Glass>

Figure 1:
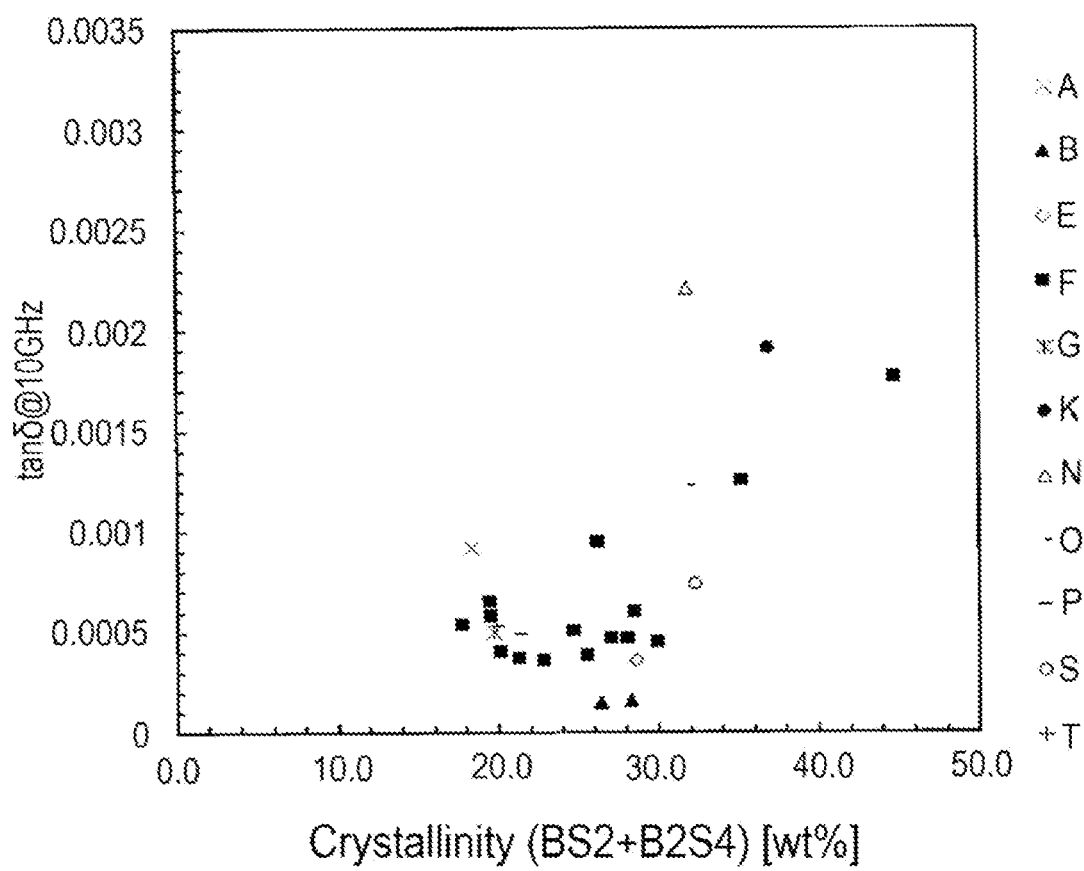
FIG. 1 is a graph showing a relationship between the sum of $BaSi_2O_5$ crystallinity and $Ba_2Si_4O_{10}$ crystallinity and the dielectric tangent tan δ that were obtained in Experimental Examples.

First, the crystallized glass according to the present invention will be described.

The crystallized glass according to the preset invention includes a crystalline phase consisting of Ba—Si—O. The crystallized glass according to the present invention can be manufactured by melt-shaping amorphous glass containing BaO and $SiO_2$ and precipitating crystals each consisting of Ba—Si—O by subjecting an amorphous glass block obtained by annealing the amorphous glass to heat treatment at a low temperature of lower than 1,000° C.

The term "crystallized glass" means glass in which crystals are precipitated. In this specification, the term "crystallized glass" means glass in which a diffraction peak indicating a crystal is found by powder X-ray diffraction (PXRD). In a powder X-ray diffraction measurement, as described later, a measurement is performed in a 2θ range of 10° to 80° using CuKα radiation. In the case where a diffraction peak occurs, a precipitated crystal can be identified by a Hanawalt method, for example.

In this specification, a glass composition is expressed in mol % based on oxides unless otherwise specified and mol % is expressed simply as "%." Furthermore, in this specification, the expression "not contained substantially" means that the content of a material concerned is lower than or equal to an impurity level in raw materials, that is, the material concerned is not added intentionally. More specifically, the content thereof is lower than 0.01%, for example.

A crystalline phase consisting of Ba—Si—O includes crystals of $BaSi_2O_5$, $Ba_2Si_4O_{10}$, $BaSiO_3$, $Ba_2Si_3O_8$, $Ba_5Si_8O_{21}$, $Ba_3Si_5O_{13}$, $Ba_3Si_5O_{21}$, etc. and preferably includes at least one of $BaSi_2O_5$ and $Ba_2Si_4O_{10}$.

$BaSi_2O_5$ is particularly small in the dielectric tangent in a high-frequency range among the above crystal species and, when $BaSi_2O_5$ is contained, it is possible to realize crystallized glass that is small in the dielectric tangent in a high-frequency range. The term "high frequency" means a frequency range that is 1 GHz or higher. In the present application, in particular, a dielectric tangent at 10 GHz or 28 GHz will be referred to. Since $Ba_2Si_4O_{10}$ is high in crystal growth rate and small in the dielectric tangent at 10 GHz, crystallized glass that is small in dielectric tangent and low in dielectric loss can be obtained with a short-time heat treatment by containing $Ba_2Si_4O_{10}$. In addition, dielectric properties such as a dielectric tangent and relative permittivity are measured by a split-post dielectric resonance method (SPDR method).

More preferably, the dielectric tangent in a high-frequency range can be made particularly small in the case where a crystalline phase consisting of Ba—Si—O includes $BaSi_2O_5$ or $Ba_2Si_4O_{10}$ as a main phase or a secondary phase.

The crystallized glass may contain a crystalline phase other than a crystalline phase consisting of Ba—Si—O in such a range that the dielectric tangent of the crystallized glass becomes too large. Examples of crystalline phases other than the crystalline phase consisting of Ba—Si—O include $K_2Ba_7Si_{16}O_{40}$, $ZrO_2$, $TiO_2$, $SnO_2$, $ZrTiO_4$, $Li_2Si_2O_5$, $Li_2SiO_3$, $LiAlSi_2O_6$, $SiO_2$, and $BaAl_2Si_2O_8$.

The above-mentioned crystal species is identified by PXRD. $BaSi_2O_5$ is a crystal that exhibits diffraction peaks at, for example, Bragg angles (2θ) of 17.5°±0.2°, 22.4°±0.2°, and 26.7°±0.2° when CuKα radiation is used, and $Ba_2Si_4O_{10}$ is a crystal that exhibits diffraction peaks at, for example, Bragg angles (2θ) of 18.9°±0.2°, 22.3°±0.2°, and 25.2°±0.2° when CuKα radiation is used.

Furthermore, to enable recognition of a more correct crystal structure, it is preferable to perform a Rietveld analysis. The Rietveld analysis enables a quantitative analysis of a crystalline phase and an amorphous phase and a structure analysis of a crystalline phase. The Rietveld analysis is described in "Crystal Analysis Handbook" edited by the "Crystal Analysis Handbook" edition committee of The Crystallographic Society of Japan (Kyoritsu Shuppan Co., Ltd., published in 1,999, pp. 492-499).

(Crystallinity)

It has been found from the above analyses that the high-frequency dielectric properties of the crystallized glass according to the present invention relate to its crystallinity which indicates a proportion of crystalline phases contained. The crystallinity is defined as a ratio of a particular kind of crystal to the entire crystallized glass. That is, $BaSi_2O_5$ crystallinity means a ratio of $BaSi_2O_5$ crystals to the entire crystallized glass. The sum of $BaSi_2O_5$ crystallinity and $Ba_2Si_4O_{10}$ crystallinity is preferably 15 wt % or larger, more preferably 17 wt % or larger, further preferably 18 wt % or larger, even further preferably 19 wt % or larger, and even still further preferably 20 wt % or larger. In the case where the sum of $BaSi_2O_5$ crystallinity and $Ba_2Si_4O_{10}$ crystallinity is in the above range, a sufficient amount of crystals can be precipitated, the dielectric tangent can be made small, and the increase of dielectric loss can be suppressed, which are preferable.

On the other hand, it is preferable that the sum of $BaSi_2O_5$ crystallinity and $Ba_2Si_4O_{10}$ crystallinity to the entire weight of the crystallized glass be 50 wt % or smaller. In this case, increase of the dielectric tangent due to grain boundaries of precipitated crystals is suppressed, and it becomes easier to make a dielectric tangent tan δ at 10 GHz 0.0030 or smaller.

The sum of $BaSi_2O_5$ crystallinity and $Ba_2Si_4O_{10}$ crystallinity is more preferably 45 wt % or smaller, further preferably 40 wt % or smaller, even further preferably 35 wt % or smaller, and even still further preferably 31 wt % or smaller. In the case where the sum of $BaSi_2O_5$ crystallinity and $Ba_2Si_4O_{10}$ crystallinity is in the above range, the proportion of grain boundaries which are one factor of increase of the dielectric tangent can be decreased and it becomes easier to make a dielectric tangent tan δ at 10 GHz 0.0010 or smaller.

More specifically, a preferable range of the sum of $BaSi_2O_5$ crystallinity and $Ba_2Si_4O_{10}$ crystallinity is 15 wt % or higher and 50 wt % or lower.

Furthermore, crystalline phases may contain an Li-based crystal. In the case where the crystallized glass contains Li in the base composition, there is an advantageous in being able to lower the crystal growth temperature and increase the crystal growth rate. On the other hand, it is preferable that the Li content in the base composition be low because Li-based crystals may precipitate in crystalline phases of crystallized glass in the case where the Li content in the base composition is high and the Li-based crystals can increase the dielectric tangent of the crystallized glass. In the case where the crystallinity of Li-based crystals to the entire weight of the crystallized glass is preferably 20 wt % or lower, it becomes easier to make the dielectric tangent tan δ at 10 GHz 0.0030 or smaller. In the case where the crystallinity of Li-based crystals is more preferably 15 wt % or lower, it becomes easier to make the dielectric tangent tan δ 0.0020 or smaller. In the case where the crystallinity of Li-based crystals is further preferably 10 wt % or lower, it becomes easier to make the dielectric tangent tan δ 0.0010 or smaller. It is even further preferable that the crystallinity of Li-based crystals be 5 wt % or lower, and it is most preferable that no Li-based crystals be contained.

More specifically, it has been found that the high-frequency dielectric properties of the crystallized glass according to the present invention relate to the crystallinity and the distortion of crystal structure. The increase of dielectric loss in a high-frequency range can be suppressed by causing precipitation of many crystals having small distortion.

Thus, the following two criteria can be used as criteria that reflect the above properties. It is preferable that at least one of the following two criteria be satisfied because in that case the dielectric tangent tan δ at 10 GHz can be made 0.0030 or smaller and the increase of dielectric loss in a high-frequency range can be suppressed.

(Criterion 1) The sum of squared difference of lattice constant that is given by the following equation is 0.050 or smaller:

$$\text{(Sum of squared difference of lattice constant)} = (A_{BS2}-A'_{BS2})^2+(B_{BS2}-B'_{BS2})^2+(C_{BS2}-C'_{BS2})^2+ (A_{B2S4}-A'_{B2S4})^2+(B_{B2S4}-B'_{B2S4})^2+(C_{B2S4}-C'_{B2S4})^2.$$

In the above equation, $A_{BS2}$, $B_{BS2}$, and $C_{BS2}$ are lattice constants of $BaSi_2O_5$ along the a axis, b axis, and c axis measured in crystalline phases, $A_{B2S4}$, $B_{B2S4}$, and $C_{B2S4}$ are lattice constants of $Ba_2Si_4O_{10}$ along the a axis, b axis, and c axis measured in the crystalline phases, $A'_{BS2}$, $B'_{BS2}$, and $C'_{BS2}$ are lattice constants of $BaSi_2O_5$ in an ideal crystalline state disclosed in ICSD Collection Code: 15486, and $A'_{B2S4}$, $B'_{B2S4}$, and $C'_{B2S4}$ are lattice constants of $Ba_2Si_4O_{10}$ in an ideal crystalline state disclosed in ICSD Collection Code: 9339. In addition, in this specification, the crystal axes are defined so that their lattice constants satisfy relationships $C_{BS2} > A_{BS2} > B_{BS2}$, $C'_{BS2} > A'_{BS2} > B'_{BS2}$, $A_{B2S4} > C_{B2S4} > B_{B2S4}$, and $A'_{B2S4} > C'_{B2S4} > B'_{B2S4}$.

(Criterion 2) The sum of a total value of the products of $BaSi_2O_5$ crystallinity and distortion values in each plane of the {002} plane, the {020} plane, and the {400} plane of $BaSi_2O_5$ and a total value of the products of $Ba_2Si_4O_{10}$ crystallinity and distortion values in each plane of the {002} plane, the {020} plane, and the {400} plane of $Ba_2Si_4O_{10}$ is 0.030 or smaller, where the {002} plane, the {020} plane, and the {400} plane indicates the Miller index notation of crystal lattice planes.

Regarding (Criterion 1):

According to criterion 1, as described above, it is preferable that the sum of squared difference of lattice constant that is given by the following equation be 0.050 or smaller:

$$\text{(Sum of squared difference of lattice constant)} = (A_{BS2} - A'_{BS2})^2 + (B_{BS2} - B'_{BS2})^2 + (C_{BS2} - C'_{BS2})^2 + (A_{B2S4} - A'_{B2S4})^2 + (B_{B2S4} - B'_{B2S4})^2 + (C_{B2S4} - C'_{B2S4})^2.$$

In the above equation, the lattice constants of $BaSi_2O_5$ in crystalline phases are represented by $A_{BS2}$, $B_{BS2}$, and $C_{BS2}$ and the lattice constants of $Ba_2Si_4O_{10}$ in crystalline phases are represented by $A_{B2S4}$, $B_{B2S4}$, and $C_{B2S4}$ as a result of a Rietveld analysis as mentioned above.

On the other hand, the lattice constants of $BaSi_2O_5$ in an ideal crystalline state are represented by $A'_{BS2}$, $B'_{BS2}$, and $C'_{BS2}$ and the lattice constants of $Ba_2Si_4O_{10}$ in an ideal crystalline state are represented by $A'_{B2S4}$, $B'_{B2S4}$, and $C'_{B2S4}$. The values disclosed in ICSD Collection Code: 15486 are employed as values of $A'_{BS2}$, $B'_{BS2}$, and $C'_{BS2}$ and the values disclosed in ICSD Collection Code: 9339 are employed as values of $A'_{B2S4}$, $B'_{B2S4}$, and $C'_{B2S4}$.

In the following, a value as mentioned above may be referred to merely as the "sum of squared difference of lattice constant."

That is, the sum of squared difference of lattice constant represents a difference of lattice constants of crystals contained in the crystallized glass according to the present invention from the lattice constants of an ideal crystal and is a parameter representing the degree of distortion of crystal structure.

In the case where the sum of squared difference of lattice constant is 0.050 or smaller, the crystallized glass contains many crystals with small distortion and hence its dielectric tangent tan δ at 10 GHz can be suppressed to 0.0030 or smaller easily. The sum of squared difference of lattice constant is more preferably 0.045 or smaller, further preferably 0.040 or smaller, even further preferably 0.035 or smaller, particularly preferably 0.030 or smaller, and most preferably 0.025 or smaller. In such cases, the dielectric tangent at 10 GHz can be reduced to a smaller value easily.

As for criterion 1, it is even preferable that the sum of $BaSi_2O_5$ crystallinity and $Ba_2Si_4O_{10}$ crystallinity be 15% or larger and 50% or smaller as represented by weight % and the sum of squared difference of lattice constant be 0.050 or smaller. It is further preferable that the sum of squared difference of lattice constant be 0.050 or smaller in addition to that the sum of $BaSi_2O_5$ crystallinity and $Ba_2Si_4O_{10}$ crystallinity is 15 wt % or larger and 50 wt % or smaller and the crystallinity of Li-based crystals is 20 wt % or smaller.

It is particularly preferable that the sum of $BaSi_2O_5$ crystallinity and $Ba_2Si_4O_{10}$ crystallinity be 15 wt % or larger and 31 wt % or smaller and the crystallinity of Li-based crystals be 20 wt % or smaller, and the sum of squared difference of lattice constant be 0.025 or smaller because in that case the dielectric tangent tan δ can be suppressed to 0.0010 or smaller.

Regarding (Criterion 2):

According to criterion 2, as described above, it is preferable that the sum (in the following, this sum may be referred to as the "sum of (crystallinity×distortion)") of a total value of the products of $BaSi_2O_5$ crystallinity and distortion values in each plane of the {400} plane, the {020} plane, and the {002} plane of $BaSi_2O_5$ and a total value of the products of $Ba_2Si_4O_{10}$ crystallinity and distortion values in each of the {400} plane, the {020} plane, and the {002} plane of $Ba_2Si_4O_{10}$ be 0.030 or smaller.

$BaSi_2O_5$ crystallinity, $Ba_2Si_4O_{10}$ crystallinity, and distortion values in the {400} plane, the {020} plane, and the {002} plane are determined by PXRD and a Rietveld analysis as mentioned above. More specifically, values obtained by subjecting peaks appearing in PXRD around 471° to 47.4°, 38.4° to 38.8°, and 12.9° to 13.1° to a Rietveld analysis are used as distortion values in the {400} plane, the {020} plane, and the {002} plane of $BaSi_2O_5$, respectively. Values obtained by subjecting peaks appearing in PXRD around 15.3° to 15.4°, 38.3° to 38.5°, and 13.0° to 13.2° to a Rietveld analysis are used as distortion values in the {400} plane, the {020} plane, and the {002} plane of $Ba_2Si_4O_{10}$, respectively.

In the case where the sum of (crystallinity×distortion) is smaller 0.030 or smaller, the total amount of distortions of crystal structure can be made small and hence the dielectric tangent tan δ at 10 GHz can be made 0.0030 or smaller easily. The sum of (crystallinity×distortion) is preferably 0.025 or smaller, more preferably 0.020 or smaller. It is further preferable that the sum of (crystallinity×distortion) be 0.019 or smaller, in which case the dielectric tangent tan δ at 10 GHz can be made 0.0010 or smaller easily. On the other hand, it is preferable that the sum of (crystallinity× distortion) be 0.001 or larger.

As for criterion 2, it is even preferable that the sum of (crystallinity×distortion) be 0.030 or smaller in addition to that the sum of $BaSi_2O_5$ crystallinity and $Ba_2Si_4O_{10}$ crystallinity is 15 wt % or larger and 50 wt % or smaller and the crystallinity of Li-based crystals is 20 wt % or smaller.

The dielectric properties of the crystallized glass can be greatly improved in the case where the above-described criterion 1 or criterion 2 is satisfied. The crystallized glass may satisfy both criteria at the same time.

(Crystallite Diameter)

The dielectric properties of the crystallized glass according to the present invention also relate to a crystallite diameter. In the case where the crystallite diameter is large, the proportion of glass-crystal interfaces and grain boundaries can be made small and hence the dielectric tangent can be suppressed. The dielectric properties of the crystallized glass according to the present invention shows a good correlation with the average crystallite diameter of $Ba_2Si_4O_{10}$ crystalline phase in particular. The average crystallite diameter of $Ba_2Si_4O_{10}$ is preferably 20 nm or larger, more preferably 32 nm or larger. In these cases, the dielectric tangent tan δ at 10 GHz is easily made 0.0010 or smaller. The average crystallite diameter of $Ba_2Si_4O_{10}$ is further preferably 40 nm or larger, even further preferably 45 nm or larger and particularly preferably 50 nm or larger. It is preferable that the average crystallite diameter be 100 nm or smaller because in that case a phenomenon that crystal grains localize to vary properties and a phenomenon of local strength reduction can be suppressed.

(Base Composition of Crystallized Glass)

The base composition of the crystallized glass according to the present invention is the same as the composition of amorphous glass before crystallization in a manufacturing method to be described later. The term "base composition of crystallized glass" as used in this specification means a combined composition of crystal portions and amorphous portions of the crystallized glass. The base composition of the crystallized glass is determined by subjecting the crystallized glass to heat treatment at a temperature that is higher than or equal to a melting temperature and analyzing a vitrified one. Examples of analysis method includes a fluorescent X-ray analysis or a laser abrasion ICP mass spectrometry.

(Orientation of Precipitated Crystals)

It may be possible to give orientation to precipitated crystals by a method of applying an electric field, magnetic field or temperature field or a method of applying stress in a process of shaping or heat treatment. In the case of particular crystal species, crystals having orientation with respect to a surface of amorphous glass may precipitate by subjecting it to heat treatment in a uniform field. However, the means for giving orientation to precipitated crystals is not limited to any of these means.

By giving orientation to precipitated crystals, it is possible to give, to the crystallized glass, anisotropy in a glass physical property as typified by a dielectric property and an optical property. For example, the term "anisotropy in a glass physical property" as used here means a property that permittivity in a direction that is perpendicular to a main surface which is a largest-area surface of a crystallized glass sheet and permittivity in a direction that is parallel with the main surface are different from each other when permittivity of the crystallized glass sheet is measured. However, an anisotropic physical property is not limited to any of the above ones.

The term "orientation of crystals" as used here means a property that the directions of precipitated crystals in the crystallized glass are parallel with a particular direction instead of being random. The orientation of crystals can be confirmed by finding that X-ray diffraction spectra obtained from a block that is the crystallized glass before being subjected to polishing, a plate that is the crystallized glass after the polishing, and a powder obtained by grinding the polished glass are different from each other, when X-ray diffraction spectra of the crystallized glass is obtained by a method to be described below.

(High-Frequency Substrate)

Crystallized glass as described above can be used as a high-frequency substrate because its dielectric tangent in a high-frequency range can be made small. The dielectric tangent at 10 GHz of a high-frequency substrate using crystallized glass according to the present invention is preferably 0.0030 or smaller, more preferably 0.0020 or smaller, further preferably 0.0010 or smaller, even further preferably 0.0008 or smaller, and particularly preferably 0.0005 or smaller. In the case where the dielectric tangent at 10 GHz satisfies the above requirement, the high-frequency substrate can be used in a high-frequency range that is higher than 10 GHz, for example, at 28 GHz or 79 GHz. The dielectric tangent at 28 GHz is preferably 0.0080 or smaller, more preferably 0.0060 or smaller, further preferably 0.0040 or smaller, even further preferably 0.0020 or smaller, and particularly preferably 0.0010 or smaller. The dielectric tangent at 79 GHz is preferably 0.0100 or smaller, more preferably 0.0080 or smaller, further preferably 0.0060 or smaller, even further preferably 0.0040 or smaller, particularly preferably 0.0030 or smaller, and most preferably 0.0020 or smaller.

As described later in a description of a manufacturing method, the crystallized glass according to the present invention can be manufactured at a low cost because it is superior in shaping performance and the crystallization treatment temperature can be set lower than 1,000° C.

Furthermore, from the viewpoint of miniaturizing a high-frequency component that uses a high-frequency substrate, the relative permittivity at 10 GHz of the high-frequency substrate using the crystallized glass according to the present invention is preferably 6.0 or larger. The relative permittivity at 10 GHz is more preferably 6.3 or larger, more preferably 6.5 or larger. On the other hand, to enable stable use in a broad frequency range, the relative permittivity is preferably 8.0 or smaller, more preferably 7.8 or smaller and further preferably 7.5 or smaller. In addition, dielectric properties such as a dielectric tangent and relative permittivity are measured by a split post dielectric resonance method (SPDR method).

To suppress occurrence of cracks when a hole is formed by laser light irradiation, it is preferable that an average thermal expansion coefficient of the crystallized glass according to the present invention that is measured in a temperature range of 50° C. to 350° C. be 15 ppm/K or smaller. The average thermal expansion coefficient is more preferably 14.5 ppm/K or smaller and further preferably 14 ppm/K or smaller. On the other hand, the average thermal expansion coefficient is preferably 10 ppm/K or larger, more preferably 11 ppm/K or larger and further preferably 12 ppm/K or larger. In the case where the average thermal expansion coefficient is in the above range, when the crystallized glass according to the present invention is used as a high-frequency substrate, a mismatch in thermal expansion coefficient between the crystallized glass and silver or copper interconnections and hence the adhesion of the interconnections can be increased.

Moreover, to dissipate, with high efficiency, heat generated when the crystallized glass according to the present invention is used as a high-frequency substrate, a thermal conductivity λ at room temperature is preferably 2.0 W/m·K or larger. The thermal conductivity λ is more preferably 2.3 W/m·K or larger, further preferably 2.5 W/m·K or larger, even further preferably 2.8 W/m·K or larger, and particularly preferably 3.0 W/m·K or larger. Thermal conductivity can be measured by a method disclosed in JIS R 1611: 2010.

In general, a high-frequency substrate has two main surfaces that are opposed to each other. In use as a high-frequency substrate according to the present invention, the area of each main surface is preferably 75 cm$^2$ or larger, more preferably 100 cm$^2$ or larger, further preferably 150 cm$^2$ or larger, even further preferably 300 cm$^2$ or larger, and particularly preferably 700 cm$^2$ or larger. A shape of a high-frequency substrate can be designed freely so as to be suitable for a use as long as the above area requirement is satisfied.

The plate thickness of the high-frequency substrate according to the present invention is preferably 1 mm or smaller, more preferably 0.8 mm or smaller and further preferably 0.7 mm or smaller. The plate thickness being in the above range is preferable because the entire circuit can be made thin when a circuit is formed by laying substrates on each other. On the other hand, the plate thickness is preferably 0.05 mm or larger, more preferably 0.2 mm or larger. Necessary strength can be secured in the case where the thickness is in this range.

Furthermore, the high-frequency substrate according to the present invention may have a hole having an opening in at least one of the main surfaces. The hole may be either a through-hole that communicate with the other main surface or a void that does not penetrate thoroughly. These holes are filled with respective conductors or conductive films are formed on their respective walls, then they can be used as parts of circuits.

The diameter of the above hole is 200 µm or smaller, for example, and is preferably 100 µm or smaller. On the other hand, it is preferable that the diameter of the hole be 1 or larger.

<Manufacturing Method for Crystallized Glass>

Next, a manufacturing method for the crystallized glass including a crystalline phase consisting of Ba—Si—O according to the present invention. Whereas a manufacturing method of a sheet glass will be described below, a glass shape can be adjusted so as to be suitable for a purpose. The manufacturing method according to the present invention includes:

obtaining an amorphous glass by melt-shaping a material containing BaO and $SiO_2$ (hereinafter referred to as an "amorphous glass shaping step"); and crystallizing the amorphous glass by holding it at a treatment temperature that is 600° C. or higher and lower than 1,000° C. (hereinafter referred to as a "crystallizing step"). The individual steps will be described below in detail.

(Amorphous Glass Shaping Step)

In this step, the material containing BaO and $SiO_2$ is melt-shaped into amorphous glass. There are no particular limitations on the melt-shaping method; for example, glass materials that have been mixed together so as to provide a glass composition described below are put into a platinum crucible, melted by setting them in an electric furnace of 1,300° C. to 1,700° C., defoamed, and homogenized. Molten glass obtained is poured into a metal die (e.g., SUS surface plate) that is kept at room temperature, held at a glass transition temperature for about 3 hours, and cooled to room temperature, thereby obtaining a glass block.

Since amorphous glass can be shaped into a desired shape from a molten state, this melt-shaping method is advantageous in that shaping can be performed easily and a large-area glass can be obtained easily over a process for ceramic etc. in which shaping is performed in a powder or slurry state and then firing is performed or a process for synthesized quartz etc. in which an ingot is manufactured and then cut into a desired shape. Furthermore, low-cost manufacture is possible even if heat treatment is performed in a crystallizing step to be described later.

The composition of amorphous glass will be described below. There are no particular limitations on the composition except that BaO and $SiO_2$ should be contained; an example composition as represented mol % based on oxides is as follows. In this composition, "0%" means that a case that the component concerned is not contained is included.

(Composition 1)

The composition includes:
from 68% to 78% of $SiO_2$;
from 0% to 5% of $Al_2O_3$;
from 24% to 35% of BaO;
from 0% to 6% of $Li_2O$;
from 0% to 3% of $Na_2O$;
from 0% to 3% of $K_2O$;
from 0% to 4% of $ZrO_2$; and
from 0% to 4% of $TiO_2$, and
satisfies from 0% to 6% of ($Li_2O+Na_2O+K_2O$).

Each component will be described below in detail.

$SiO_2$ is a component for forming a glass network structure and hence is an essential component. $SiO_2$ is also a component of $BaSi_2O_5$ and $Ba_2Si_4O_{10}$ which are precipitated crystals. In the amorphous glass, it is preferable that the content of $SiO_2$ be 68% or higher, in which case the amorphous glass can be increased in chemical durability and target crystals can be precipitated. The content of $SiO_2$ is more preferably 68.5% or higher, further preferably 69% or higher and even further preferably 69.5% or higher. On the other hand, in the case where the content of $SiO_2$ in the amorphous glass is 78% or lower, the viscosity of the amorphous glass lowers when it melts and hence the amorphous glass is melted easily and target crystals can be precipitated easily. The content of $SiO_2$ is preferably 75% or lower, more preferably 74% or lower, further preferably 73% or lower, and even further preferably 72% or lower.

BaO is a structural component of precipitated crystals and hence is an essential component. In the amorphous glass, it is preferable that the content of BaO be 24% or higher, in which case the viscosity of the amorphous glass lowers when it melts and hence the amorphous glass is melted easily and target crystals can be precipitated. The content of BaO is more preferably 25% or higher, further preferably 26% or higher and most preferably 27% or higher. On the other hand, it is preferable that the content of BaO be 35% or lower, in which case the amorphous glass can be increased in chemical durability and target crystals can be precipitated. The content of BaO is more preferably 33% or lower, more preferably 32% or lower, further preferably 31% or lower, and particularly preferably 30% or lower.

$Li_2O$ is an optional component and may be contained. $Li_2O$ lowers the temperature at which crystals consisting of Ba—Si—O is generated and increases the crystal growth rate. The content of $Li_2O$ is preferably higher than 0%, more preferably 0.01% or higher, further preferably 0.05% or higher, even further preferably 0.1% or higher, even still further preferably 0.2% or higher, particularly preferably 0.5% or higher, and most preferably 1% or higher. On the other hand, it is preferable that the content of $Li_2O$ be 6% or lower, in which case phase separation of the amorphous glass that increases its dielectric tangent of the crystallized glass and influences its crystallization behavior and precipitation of crystalline phase containing Li can be suppressed. The content of $Li_2O$ is more preferably 5% or lower, further preferably 4% or lower.

$Al_2O_3$ is an optional component and may be contained. $Al_2O_3$ contributes to suppression of crystallization at the time of casting of amorphous glass and increase of chemical durability of the amorphous glass. In the case where $Al_2O_3$ is contained, the content of $Al_2O_3$ is preferably 0.01% or higher, more preferably 0.05% or higher and further preferably 0.1% or higher. On the other hand, it is preferable that $Al_2O_3$ be contained in a range that does not exceed 5%, in which case increase of the dielectric tangent of the crystallized glass can be suppressed. The content of $Al_2O_3$ is more preferably 3% or lower, further preferably 2% or lower, even further preferably 1% or lower, even still further preferably 0.9% or lower, particularly preferably 0.8% or lower, even particularly preferably 0.7% or lower, and most preferably 0.5% or lower.

$Na_2O$ is an optional component and, like $Li_2O$, lowers the temperature at which crystals consisting of Ba—Si—O is generated and contributes to increase of the crystal growth rate. In the case where $Na_2O$ is contained, the content of $Na_2O$ is preferably 0.01% or higher, more preferably 0.05% or higher and further preferably 0.01% or higher. On the other hand, it is preferable that $Na_2O$ be contained in a range that does not exceed 3%, in which case increase of the dielectric tangent can be suppressed in amorphous portions of the crystallized glass. The content of $Na_2O$ is more preferably 2% or lower, further preferably 0.9% or lower, even further preferably 0.8% or lower, particularly preferably 0.7% or lower, and most preferably 0.5% or lower.

$K_2O$ is an optional component and, like $Li_2O$, lowers the temperature at which crystals consisting of Ba—Si—O is generated and contributes to increase of the crystal growth rate. Furthermore, in the case where $K_2O$ is contained, $K_2Ba_7Si_{16}O_{40}$ which is small in dielectric tangent precipitates, thereby lowering the dielectric tangent. In the case where $K_2O$ is contained, the content of $K_2O$ is preferably 0.01% or higher, more preferably 0.1% or higher, further preferably 0.5% or higher, and particularly preferably 1% or higher. On the other hand, in the case where $K_2O$ is contained in a range that does not exceed 3%, increase of the dielectric tangent of amorphous portions of the crystallized glass can be suppressed. The content of $K_2O$ is more preferably 2% or lower, further preferably 1% or lower.

$Li_2O$, $Na_2O$, and $K_2O$ are optional components and it is preferable that the total content ($Li_2O+Na_2O+K_2O$) of them be from 0% to 6%. It is more preferable that ($Li_2O+Na_2O+K_2O$) be higher than 0% because the crystallization start temperature lowers when they are contained. It is further preferable that ($Li_2O+Na_2O+K_2O$) be 0.2% or higher, even further preferably 0.5% or higher, particularly preferably 1% or higher. On the other hand, in the case where the total content of $Li_2O$, $Na_2O$, and $K_2O$ is 6% or lower, increase of the dielectric tangent of amorphous portions of the crystallized glass can be suppressed. It is even preferable that ($Li_2O+Na_2O+K_2O$) be 5.5% or lower, further preferably 5% or lower, particularly preferably 4% or lower, and most preferably 3% or lower.

$ZrO_2$ is an optional component and may be contained because it is a component constituting crystal nucleus in crystallization treatment. The content of $ZrO_2$ is preferably higher than 0%, more preferably 0.01% or higher, further preferably 0.1% or higher, and even further preferably 0.5% or higher. On the other hand, it is preferable that $ZrO_2$ be contained in a range that does not exceed 4% because in that case increase of the dielectric tangent can be suppressed. The content of $ZrO_2$ is more preferably 3% or lower, further preferably 2% or lower.

$TiO_2$ is an optional component and may be contained because it is a component constituting crystal nucleus in crystallization treatment. The content of $TiO_2$ is preferably higher than 0%, more preferably 0.01% or higher, further preferably 0.1% or higher, and even further preferably 0.5% or higher. On the other hand, it is preferable that $TiO_2$ be contained in a range that does not exceed 4% because in that case increase of the dielectric tangent can be suppressed. The content of $TiO_2$ is more preferably 3% or lower, further preferably 2% or lower.

The total content of $ZiO_2$ and $TiO_2$ is preferably higher than 0%, more preferably 0.5% or higher and further preferably 1% or higher. On the other hand, the total content of $ZiO_2$ and $TiO_2$ is preferably 5% or lower, more preferably 3% or lower and further preferably 2% or lower.

Although $P_2O_5$ is not essential, it may be contained because it has an effect of accelerating crystallization by prompting phase separation of glass. In the case where $P_2O_5$ is contained, its content is preferably 0.01% or higher, more preferably 0.1% or higher and further preferably 0.2% or higher. On the other hand, in the case where the content of $P_2O_5$ is too high, surface crystallization may occur at the time of crystallization treatment to cause breaking of crystallized glass during processing crystallized glass. The content of $P_2O_5$ is preferably 1% or lower, more preferably 0.8% or lower, further preferably 0.6% or lower, and particularly preferably 0.5% or lower.

Other components may be contained in such ranges as not to impair performance. Examples of the other components include $B_2O_3$, MgO, CaO, SrO, ZnO, $SnO_2$, CeO, $Fe_2O_3$, $Rb_2O$, $Y_2O_3$, $SO_3$, Cl, F, $Ag_2O$, $WO_3$, $MnO_2$, CoO, $Sb_2O_3$, $Au_2O_3$, and $Cr_2O_3$, which may be contained in the form of either metal ions or oxides. The content of these components is preferably 5% or lower, more preferably 3% or lower, further preferably 2% or lower, particularly preferably 1% or lower, and especially preferably 0.5% or lower.

(Composition 2)

The crystallized glass according to the present invention may have a composition α that is determined by the following test method. It is preferable that in the crystallized glass having the composition α the sum of squared difference of lattice constant and a dielectric tangent at 10 GHz that are determined by the following test method have a linear relationship.

Test Method:
(i) Plural kinds of amorphous glass having the composition α are prepared and plural samples are produced under different crystallization conditions.
(ii) A dielectric tangent at 10 GHz of each of the above samples is measured.
(iii) In each of the above samples, lattice constants $A_{BS2}$, $B_{BS2}$, and $C_{BS2}$ of $BaSi_2O_5$ in crystalline phases and $A_{B2S4}$, $B_{B2S4}$, and $C_{B2S4}$ of $Ba_2Si_4O_{10}$ in the crystalline phases are measured using a Rietveld analysis.
(iv) For each of the above samples, the sum of squared difference of lattice constant is determined according to the following equation:

(Sum of squared difference of lattice constant)=
$(A_{BS2}-A'_{BS2})^2+(B_{BS2}-B'_{BS2})^2+(C_{BS2}-C'_{BS2})^2+$
$(A_{B2S4}-A'_{B2S4})^2+(B_{B2S4}-B'_{B2S4})^2+(C_{B2S4}-C'_{B2S4})^2$, where $A'_{BS2}$, $B'_{BS2}$, and $C'_{BS2}$ are lattice constants of $BaSi_2O_5$ in an ideal crystalline state disclosed in ICSD Collection Code: 15486 and $A'_{B2S4}$, $B'_{B2S4}$, and $C'_{B2S4}$ are lattice constants of $Ba_2Si_4O_{10}$ in an ideal crystalline state disclosed in ICSD Collection Code: 9339.

(v) A correlation between the sums of squared difference of lattice constant of the plural samples and dielectric tangents at 10 GHz of the plural samples is determined.

An expression "the sums of squared difference of lattice constant of the samples and dielectric tangents at 10 GHz of the samples plotted have a linear relationship" means that a correlation coefficient $R^2$ value of a linear approximation performed by the least squares method is 0.85 or larger.

Since the sum of squared difference of lattice constant are values indicating the degree of distortion of crystalline phases, in the case where the sum of squared difference of lattice constant and the dielectric tangents at 10 GHz have a linear relationship, the dielectric tangent at 10 GHz increases linearly as the degree of distortion of crystalline phases of $BaSi_2O_5$ and $Ba_2Si_4O_{10}$ increases. In this case, it is considered that only $BaSi_2O_5$ and $Ba_2Si_4O_{10}$ exist dominantly in crystalline phases of the crystallized glass. Thus, $BaSi_2O_5$ and $Ba_2Si_4O_{10}$ can be precipitated dominantly at the crystallizing step by selecting the composition α with which the sum of squared difference of lattice constant and the dielectric tangents at 10 GHz have a linear relationship.

That is, in the case where the crystallized glass has the composition α, it is preferable that the following relationships hold where X is the sum of squared difference of lattice constant, Y is the dielectric tangent at 10 GHz, and a and b are an arbitrary slope and intercept, respectively:

$$Y=aX+b,$$

$$a>0, \text{ and}$$

$$b<0.0030.$$

It is preferable that the intercept b satisfy b<0.0030. The intercept b is a value that the dielectric tangent can take at 10 GHz when the degree of distortion of crystalline phases is equal to 0. It becomes easier for the dielectric tangent tan δ at 10 GHz to become 0.0030 or smaller by reducing distortion of crystalline phases through optimization of the crystallizing step by at least selecting the composition α with which b<0.0030 is satisfied. It is more preferable that b≤0.0025 be satisfied, further preferably b≤0.0020, even further preferably b≤0.0015, particularly preferably b≤0.0010, and most preferably b≤0.0008.

In general, a>0 is satisfied. It is preferable that a<0.060 be satisfied, more preferably a<0.0050. In the case where it is further preferable that a<0.0040 be satisfied, the dielectric tangent is not prone to increase as the distortion increases and hence it is easier to adjust manufacturing conditions.

It is preferable that amorphous glass that is used for manufacture of crystallized glass according to the present invention have the above-described composition 1 or composition 2.

(Crystallizing Step)

The amorphous glass obtained by the amorphous glass shaping step can turn to crystallized glass by subjecting the amorphous glass to heat treatment in which it is held at a treatment temperature of 600° C. or higher and lower than 1,000° C. and causing precipitation of crystals consisting of Ba—Si—O. Crystallization proceeds in the case where the treatment temperature is 600° C. or higher. The treatment temperature is more preferably 630° C. or higher, further preferably 660° C. or higher, even further preferably 690° C. or higher, and particularly preferably 710° C. or higher. It is preferable that the treatment temperature be in the above range because in that case the crystallization proceeds sufficiently, the crystallization rate is made high, the distortion of precipitated crystals is suppressed, and the crystallite diameters can be increased.

On the other hand, the treatment temperature is preferably 980° C. or lower, more preferably 950° C. or lower, further preferably 900° C. or lower, even further preferably 870° C. or lower, and particularly preferably 850° C. or lower. In the case where the treatment temperature is in the above range, crystals consisting of Ba—Si—O can be made a main phase and local precipitation of crystals can be avoided. Furthermore, the energy and cost that are necessary for heat treatment can be made lower than in the case of crystallized glass having cordierite and indialite as main phases.

More specifically, it is preferable that the treatment temperature be adjusted according to glass materials. It is preferable that the treatment temperature of the amorphous glass be higher than or equal to a glass transition temperature Tg that is calculated when the amorphous glass is subjected to a measurement that is performed according to the following procedure using a differential scanning calorimeter (DSC). In the present application, a measurement of a crystallization temperature using a DSC is performed in the following manner.

(Crystallization Temperature Using DSC)

A PXRD measurement is performed on a sample that has been heat-treated at a heat generation peak temperature obtained by performing a measurement using a differential scanning calorimeter (DSC) on an amorphous glass powder obtained by grinding, and then a temperature at which crystallization is found is determined as a crystallization temperature. The DSC measurement is performed from room temperature to 1,200° C. under the conditions that the particle diameter of an amorphous glass powder is from 106 μm to 180 μm and the heat increasing rate is 10° C./min.

The holding time at the above-mentioned treatment temperature is preferably 0.5 hour or longer, more preferably 1 hour or longer, further preferably 3 hours or longer, and particularly preferably 6 hours or longer. In the case where the holding time is in the above range, crystallization proceeds sufficiently. On the other hand, since heat treatment of a long time increases the cost of the heat treatment, the heating time is preferably 48 hours or shorter, more preferably 40 hours or shorter and particularly preferably 30 hours or shorter.

While amorphous glass is held at the above treatment temperature, the treatment temperature may be either kept constant or increased or decreased as long as it is in the above range. For example, the treatment temperature may be increased from room temperature to a first treatment temperature, kept at the first treatment temperature for a prescribed time, and then decreased gradually to room temperature. Alternatively, a two-step heat treatment may be selected in which the treatment temperature is increased from room temperature to a first treatment temperature, kept at the first treatment temperature for a prescribed time, then kept for a prescribed time at a second treatment temperature that is higher than the first treatment temperature, and decreased gradually to room temperature. The two-step heat treatment is preferable because the crystallite diameter can be controlled so as to be uniform.

In the case of the two-step heat treatment, it is preferable that the first treatment temperature be in a temperature range in which the crystal nucleus generation rate is high in a glass composition concerned and that the second treatment temperature be in a temperature range in which the crystal growth rate is high in the glass composition concerned. A temperature at which the crystal nucleus generation rate is high corresponds to a temperature that is higher than or equal to a grass transfer temperature Tg by the above-mentioned DSC and lower than or equal to a crystallization start temperature Tx by the above-mentioned DSC, and a temperature at which the crystal growth rate is high indicates a temperature that is higher than or equal to the crystallization start temperature Tx by the above-mentioned DSC.

Figure 5:
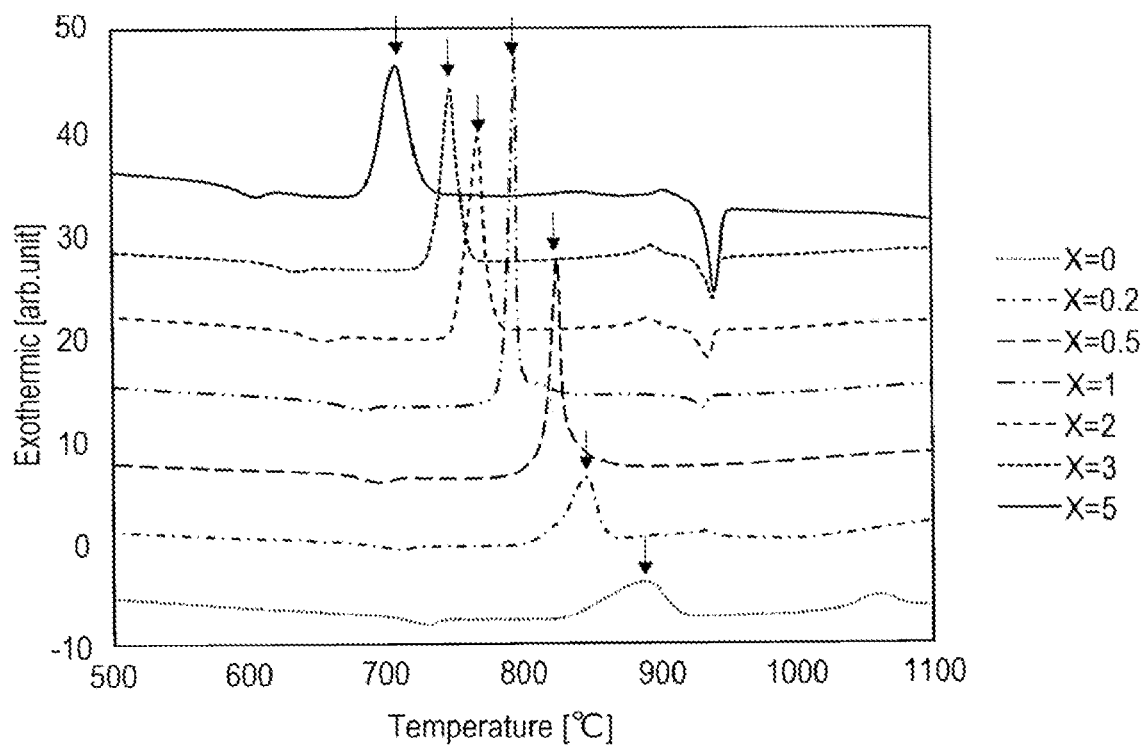
FIG. 5 shows DSC measurement results which show the crystallization start temperatures when X of a composition $XLi_2O$-(30−X)$BaO$-70$SiO_2$ is changed so as to be 0.2, 0.5, 1.0, 2.0, 3.0, and 5.0.

The crystallized glass of the present invention can lower the crystallization start temperature Tx to enable crystallization treatment to be performed at a lower temperature by containing alkali metals of $Li_2O$, $Na_2O$, and $K_2O$. For example, FIG. 5 shows DSC measurement results which show the crystallization start temperatures when X of a composition $XLi_2O$-$(30–X)BaO$-$70SiO_2$ is changed so as to be 0.2, 0.5, 1.0, 2.0, 3.0, and 5.0. Peaks indicated by arrows in FIG. 5 indicate crystallization peak temperatures. It is seen from the results shown in FIG. 5 that the crystallization start temperature Tx lowers as the $Li_2O$ increases. It is noted that in the DSC measurement of FIG. 5 the particle diameter of crystallized glass was from 106 μm to 180 μm and the temperature increase rate was set at 10° C./min.

Although there are no particular limitations on the temperature increase rate, it is preferable that the temperature increase rate be 10° C./min or lower, in which case breaking due to a mismatch between an expansion coefficient of an amorphous phase and that of a crystalline phase that occurs at the time of temperature increase can be suppressed. On the other hand, in general, the temperature increase rate is 5° C./min or higher.

Although there are no particular limitations on the temperature decrease rate, the temperature decrease rate is preferably 10° C./min or lower, more preferably 5° C./min or lower, and further preferably 1° C./min or lower. In these cases, a warp of the crystallized glass and breaking due to a mismatch between an expansion coefficient of an amorphous phase and that of a crystalline phase can be suppressed at the time of temperature decrease. On the other hand, in general, the temperature decrease rate is 0.5° C./min or higher.

Crystals consisting of Ba—Si—O are precipitated in the amorphous glass and the crystallized glass as described above can be manufactured by the above-described steps.
(Manufacturing Method for High-Frequency Substrate)

A high-frequency substrate including the above-described crystallized glass may be manufactured. In this case, it is preferable that the crystallized glass be shaped into a sheet shape whose major surfaces are opposed to each other.

A step of forming a hole in the high-frequency substrate may be included further. It is preferable to use a laser as a means for forming the hole.

There are no particular limitations on the type of laser; for example, a $CO_2$ laser, a He—Ne laser, an Ar ion laser, an excimer XeF laser, a Er:YAG laser, a Nd:YAG laser, a second harmonic and third harmonic of Nd:YAG laser, a ruby laser, or a fiber laser is employed. For example, the laser light wavelength is from 190 nm to 10.6 μm.

To suppress occurrence of cracks around the hole, it is preferable that the laser processing employ a technique with which the influence of heat generated is made as small as possible; for example, a short-wavelength laser can be used. The wavelength, for example, is preferably 1,064 nm or shorter, more preferably 780 nm or shorter and further preferably 532 nm or shorter. In the case where a longer-wavelength-side laser such as a $CO_2$ laser is used, it is possible to suppress the influence of heat by causing the laser to make short-pulse oscillation.

EXAMPLES

Next, the invention will be described further using Experimental Examples set forth below. In the following Experimental Examples, kinds of glass having compositions shown in Tables 1 and 2 were used. Experimental Examples 1-22, 25-32, 34-36, 44, 45 and 47 are Examples. Experimental Examples 23, 24, 33, 37-43 and 46 are Reference Examples.

TABLE 1

| Glass material (mol %) | A | B | C | D | E | F | G | H | I | J | K |
|---|---|---|---|---|---|---|---|---|---|---|---|
| $SiO_2$ | 70 | 69.9 | 70 | 70 | 70 | 70 | 70 | 70 | 70 | 70 | 70 |
| $Al_2O_3$ | 0 | 0 | 0 | 0 | 0 | 0 | 0 | 0 | 0 | 0 | 0 |
| $B_2O_3$ | 0 | 0 | 0 | 0 | 0 | 0 | 0 | 0 | 0 | 0 | 0 |
| MgO | 0 | 0 | 0 | 0 | 0 | 0 | 0 | 0 | 0 | 0 | 0 |
| CaO | 0 | 0 | 0 | 0 | 0 | 0 | 0 | 0 | 0 | 0 | 0 |

TABLE 1-continued

| Glass material (mol %) | A | B | C | D | E | F | G | H | I | J | K |
|---|---|---|---|---|---|---|---|---|---|---|---|
| SrO | 0 | 0 | 0 | 0 | 0 | 0 | 0 | 0 | 0 | 0 | 0 |
| BaO | 30 | 29.9 | 29.8 | 29.5 | 29 | 28 | 27 | 25 | 29.5 | 29 | 28 |
| $Li_2O$ | 0 | 0.2 | 0.2 | 0.5 | 1 | 2 | 3 | 5 | 0 | 0 | 0 |
| $Na_2O$ | 0 | 0 | 0 | 0 | 0 | 0 | 0 | 0 | 0.5 | 1 | 2 |
| $K_2O$ | 0 | 0 | 0 | 0 | 0 | 0 | 0 | 0 | 0 | 0 | 0 |
| $ZrO_2$ | 0 | 0 | 0 | 0 | 0 | 0 | 0 | 0 | 0 | 0 | 0 |
| $TiO_2$ | 0 | 0 | 0 | 0 | 0 | 0 | 0 | 0 | 0 | 0 | 0 |
| $SnO_2$ | 0 | 0 | 0 | 0 | 0 | 0 | 0 | 0 | 0 | 0 | 0 |
| $SiO_2$ + BaO | 100 | 99.8 | 99.8 | 99.5 | 99 | 98 | 97 | 95 | 99.5 | 99 | 98 |

TABLE 2

| Glass material (mol %) | L | N | O | P | Q | R | S | T |
|---|---|---|---|---|---|---|---|---|
| $SiO_2$ | 70 | 70 | 70 | 70 | 69 | 68 | 66.7 | 66.7 |
| $Al_2O_3$ | 0 | 0 | 0 | 0 | 1 | 2 | 0 | 0 |
| $B_2O_3$ | 0 | 0 | 0 | 0 | 0 | 0 | 0 | 0 |
| MgO | 0 | 0 | 0 | 0 | 0 | 0 | 0 | 0 |
| CaO | 0 | 0 | 0 | 0 | 0 | 0 | 0 | 0 |
| SrO | 0 | 0 | 0 | 0 | 0 | 0 | 0 | 0 |
| BaO | 28 | 28 | 28 | 28 | 28 | 28 | 33.3 | 30 |
| $Li_2O$ | 0 | 0 | 0 | 0 | 2 | 2 | 0 | 3.3 |
| $Na_2O$ | 0 | 0 | 0 | 0 | 0 | 0 | 0 | 0 |
| $K_2O$ | 2 | 0 | 0 | 0 | 0 | 0 | 0 | 0 |
| $ZrO_2$ | 0 | 0 | 2 | 1 | 0 | 0 | 0 | 0 |
| $TiO_2$ | 0 | 2 | 0 | 1 | 0 | 0 | 0 | 0 |
| $SnO_2$ | 0 | 0 | 0 | 0 | 0 | 0 | 0 | 0 |
| $SiO_2$ + BaO | 98 | 98 | 98 | 98 | 97 | 96 | 100 | 96.7 |

Next, each Experimental Example will be described in detail. Experimental conditions and results of the Experimental Examples are summarized in the following Tables 3-6 and FIGS. 1-3.

Experimental Example 1

Glass materials were mixed together so as to have a glass composition indicated by "F" in Table 1 and weighed out so as to obtain 500 g of glass. Then the mixed glass materials were put into a platinum crucible, melted for about 3 hours by setting them in an electric furnace of 1,600° C., defoamed, and homogenized. Molten glass obtained was poured into a metal die (e.g., SUS surface plate) that was kept at room temperature, held at a glass transition temperature for 3 hours by setting the metal die in a furnace, and cooled to room temperature at a rate of 0.5° C./min, thereby obtaining an amorphous glass block.

Subsequently, the amorphous glass block thus obtained was processed into a cuboid having a length of 30.0 mm, a width of 30.0 mm, and a thickness of 2.0 mm and a surface having 30.0 mm×30.0 mm was polished into a mirror surface. The amorphous glass obtained by the process was set in a furnace, the temperature was increased to 720° C. at a rate of 5° C./min, the amorphous glass was heated at 720° C. for 6 hours, and cooled to room temperature at a rate of 5° C./min, thereby obtaining crystallized glass. Physical properties of the crystallized glass thus obtained were evaluated by the following methods.
(Measurement of Dielectric Properties of Amorphous Glass and Crystallized Glass)

Each of the amorphous glass obtained and the crystallized glass obtained was processed into a cuboid having a length of 30.0 mm, a width of 30.0 mm, and a thickness of 0.5 mm and a surface having 30.0 mm×30.0 mm was polished into a mirror surface. Relative permittivity $\varepsilon_r$ and a dielectric tangent tan δ at 10 GHz were measured by a split-post dielectric resonance method (SPDR method) using a network analyzer.

(Measurement of Crystallinity, Crystallite Diameter, and Distortion of Crystallized Glass)

Identification of crystal species was done by performing a PXRD measurement on the crystallized glass obtained according to the following procedure. A Rietveld analysis was performed thereafter, and crystallinity, average crystallite diameters in the {400} plane, the {020} plane, and the {002} plane, and distortion values in the {400} plane, the {020} plane, and the {002} plane from results obtained.

(Manufacturing Conditions of Samples for PXRD Measurement)

The crystallized glass that was subjected to the SPDR method was ground using an agate mortar and an agate pestle, thereby obtaining a powder for PXRD measurement.

(PXRD Measurement Conditions)

Precipitated crystals were identified by performing powder X-ray diffraction under the following conditions on the powder for PXRD measurement obtained.

Identification of crystal species was done using diffraction peak patterns included in an ICSD inorganic crystal structure database and an ICDD powder diffraction database.

Measuring instrument: "SmartLab" produced by Rigaku Corporation;
measuring method: concentration method;
tube voltage: 45 kV;
tube current: 200 mA;
X-ray used: CuKα ray;
measurement range: 2θ=10° to 80°;
speed: 10°/min; and
step: 0.02°.

(Manufacturing Conditions of Samples for Rietveld Analysis)

After the glass powder that was used for the PXRD measurement (PXRD measurement powder) was passed through a mesh of 500 μm, ZnO was added by 10 wt % as a standard substance, thereby obtaining a powder for Rietveld analysis measurement.

(Rietveld Analysis Conditions)

The powder for Rietveld analysis measurement thus obtained was subjected to powder X-ray diffraction under the following conditions and a Rietveld analysis was performed using results obtained.

Measuring instrument: "SmartLab" produced by Rigaku Corporation;
measuring method: concentration method;
tube voltage: 45 kV;
tube current: 200 mA;
X-ray used: CuKα ray;
measurement range: 2θ=10° to 90°;
speed: 5°/min; and
step: 0.01°.

A powder X-ray diffraction profile acquired under the above conditions was analyzed using a Rietveld analysis program "Rietan FP." An analysis of each sample was converged so that Rwp which indicates whether the convergence of analysis was good or bad became 10 or smaller. The Rietveld analysis is described in "Crystal Analysis Handbook" edited by the "Crystal Analysis Handbook" edition committee of The Crystallographic Society of Japan (Kyoritsu Shuppan Co., Ltd., published in 1,999, pp. 492-499).

(Calculation of Crystallinity)

A calculation was performed so that remaining phases amount to a total of 100 wt % by subtracting added ZnO of 10 wt % from a weight ratio between crystalline phases obtained by the Rietveld analysis and a remaining glass phase.

(Calculation of Crystallite Diameter)

Crystallite sizes were calculated according to the Scherrer equation using 2θ values and full width at half maximum (FWHM) β relating to peaks of the {400} plane, the {020} plane, and the {002} plane of $BaSi_2O_5$ and $Ba_2Si_4O_{10}$ that were obtained by the Rietveld analysis and a wavelength $\lambda_{Cu-K\alpha}$ of Cu-Kα ray 1.540593 Å that was used for the measurement. In this case, the Scherrer constant K was set at 0.9.

$$(\text{Crystallite diameter}) = K \times \lambda_{Cu-K\alpha}/(\beta \times \cos\theta)$$

(Calculation of Distortion)

A degree of distortion Dd/d that was obtained by the Rietveld analysis was used.

Experimental Examples 2-22

In Experimental Examples 2-22, amorphous glass was formed using the same composition and method as in Experimental Example 1 and crystallized by a different heat treatment method. Changes of the heat treatment method from Experimental Example 1 and experimental results are shown in the following Tables 3-6.

TABLE 3

| | Experimental Example 1 | Experimental Example 2 | Experimental Example 3 | Experimental Example 4 | Experimental Example 5 | Experimental Example 6 |
|---|---|---|---|---|---|---|
| Glass | F | F | F | F | F | F |
| 1st step heat treatment temperature (° C.) | 665 | 720 | 720 | 745 | 745 | 745 |
| Holding time (h) | 24 | 6 | 24 | 0.25 | 0.5 | 1 |
| Temperature increase/decrease rate (° C./min) | 5 | 5 | 5 | 5 | 5 | 5 |
| 2nd step heat treatment temperature (° C.) | ND | ND | ND | ND | ND | ND |
| Holding time (h) | ND | ND | ND | ND | ND | ND |
| Temperature increase/decrease rate (° C./min) | ND | ND | ND | ND | ND | ND |
| Resonance frequency f (GHz) | 9.6 | 9.7 | 9.7 | 9.6 | 9.7 | 9.7 |
| Relative permittivity $\varepsilon_r$ (—) | 8.0 | 7.4 | 7.3 | 8.0 | 7.2 | 7.2 |
| Dielectric tangent tanδ (—) | 0.00177 | 0.00095 | 0.00065 | 0.00528 | 0.00054 | 0.0006 |
| Precipitated crystal (1) | $BaSi_2O_5$ | $BaSi_2O_5$ | $BaSi_2O_5$ | $BaSi_2O_5$ | $BaSi_2O_5$ | $BaSi_2O_5$ |
| Crystallinity (wt %) | 11 | 5 | 0 | ND | 0 | 0 |

TABLE 3-continued

|  | Experimental Example 1 | Experimental Example 2 | Experimental Example 3 | Experimental Example 4 | Experimental Example 5 | Experimental Example 6 |
|---|---|---|---|---|---|---|
| Axis length a (Å) | 7.65 | 7.68 | — | ND | — | — |
| Axis length b (Å) | 4.69 | 4.68 | — | ND | — | — |
| Axis length c (Å) | 13.69 | 13.63 | — | ND | — | — |
| Axis angle α (degree) | 90 | 90 | — | ND | — | — |
| Axis angle γ (degree) | 90 | 90 | — | ND | — | — |
| Axis angle β (degree) | 90 | 90 | — | ND | — | — |
| Crystallite diameter {400}_BS2 (nm) | 32 | 33 | — | ND | — | — |
| Crystallite diameter {020} BS2 (nm) | 48 | 39 | — | ND | — | — |
| Crystallite diameter {002} BS2 (nm) | 70 | 43 | — | ND | — | — |
| Distortion {400}_BS2 (—) | 0.011 | 0.010 | — | ND | — | — |
| Distortion {020}_BS2 (—) | 0.009 | 0.011 | — | ND | — | — |
| Distortion {002}_BS2 (—) | 0.017 | 0.028 | — | ND | — | — |
| Precipitated crystal (2) | $Ba_2Si_4O_{10}$ | $Ba_2Si_4O_{10}$ | $Ba_2Si_4O_{10}$ | $Ba_2Si_4O_{10}$ | $Ba_2Si_4O_{10}$ | $Ba_2Si_4O_{10}$ |
| Crystallinity (wt %) | 33 | 21 | 19 | ND | 18 | 29 |
| Axis length a (Å) | 23.25 | 23.19 | 23.22 | ND | 23.19 | 23.20 |
| Axis length b (Å) | 4.69 | 4.69 | 4.68 | ND | 4.68 | 4.68 |
| Axis length c (Å) | 13.70 | 13.62 | 13.63 | ND | 13.61 | 13.61 |
| Axis angle α (degree) | 90 | 90 | 90 | ND | 90 | 90 |
| Axis angle γ (degree) | 98.5 | 97.8 | 97.7 | ND | 97.6 | 97.6 |
| Axis angle β (degree) | 90 | 90 | 90 | ND | 90 | 90 |
| Crystallite diameter {400}_B2S4 (nm) | 38 | 43 | 47 | ND | 48 | 41 |
| Crystallite diameter {020}_B2S4 (nm) | 27 | 32 | 36 | ND | 39 | 33 |
| Crystallite diameter {002}_B2S4 (nm) | 77 | 32 | 40 | ND | 43 | 40 |
| Distortion {400}_B2S4 (—) | 0.027 | 0.024 | 0.022 | ND | 0.021 | 0.025 |
| Distortion {020}_B2S4 (—) | 0.016 | 0.013 | 0.012 | ND | 0.011 | 0.013 |
| Distortion {002}_B2S4 (—) | 0.016 | 0.038 | 0.031 | ND | 0.028 | 0.030 |
| Crystallinity (BS2 + B2S4) (wt %) | 45 | 26 | 19 | ND | 18 | 29 |
| Sum of distortion values (BS2 + B2S4) (—) | 0.096 | 0.125 | 0.064 | ND | 0.061 | 0.068 |
| Lattice distortion {020} × crystallinity (BS2 + B2S4) (wt %) | 0.0063 | 0.0033 | 0.0023 | ND | 0.0019 | 0.0036 |
| Lattice distortion {002} × crystallinity (BS2 + B2S4) (wt %) | 0.0073 | 0.0095 | 0.0059 | ND | 0.0051 | 0.0086 |
| Sum of squared difference of lattice constant (Å²) | 0.042 | 0.014 | 0.001 | ND | 0.0004 | 0.0004 |
| Sum of (lattice distortion × crystallinity) | 0.024 | 0.018 | 0.012 | 0.000 | 0.011 | 0.019 |

TABLE 4

|  | Experimental Example 7 | Experimental Example 8 | Experimental Example 9 | Experimental Example 10 | Experimental Example. 11 |
|---|---|---|---|---|---|
| Glass | F | F | F | F | F |
| 1st step heat treatment temperature (° C.) | 745 | 745 | 770 | 770 | 770 |
| Holding time (h) | 6 | 24 | 1 | 6 | 24 |
| Temperature increase/decrease rate (° C./min) | 5 | 5 | 5 | 5 | 5 |
| 2nd step heat treatment temperature (° C.) | ND | ND | ND | ND | ND |
| Holding time (h) | ND | ND | ND | ND | ND |
| Temperature increase/decrease rate (° C./min) | ND | ND | ND | ND | ND |
| Resonance frequency f (GHz) | 9.7 | 9.7 | 9.7 | 9.7 | 9.7 |
| Relative permittivity $\varepsilon_r$ (—) | 7.3 | 7.1 | 7.1 | 7.1 | 6.8 |
| Dielectric tangent tanδ (—) | 0.00051 | 0.00047 | 0.00038 | 0.00037 | 0.0004 |
| Precipitated crystal (1) | $BaSi_2O_5$ | $BaSi_2O_5$ | $BaSi_2O_5$ | $BaSi_2O_5$ | $BaSi_2O_5$ |
| Crystallinity (wt %) | 3 | 10 | 3 | 5 | 16 |
| Axis length a (Å) | 7.68 | 7.69 | 7.67 | 7.69 | 7.68 |
| Axis length b (Å) | 4.67 | 4.66 | 4.66 | 4.66 | 4.65 |
| Axis length c (Å) | 13.59 | 13.52 | 13.52 | 13.52 | 13.50 |
| Axis angle α (degree) | 90 | 90 | 90 | 90 | 90 |
| Axis angle γ (degree) | 90 | 90 | 90 | 90 | 90 |
| Axis angle β (degree) | 90 | 90 | 90 | 90 | 90 |
| Crystallite diameter {400}_BS2 (nm) | 40 | 49 | 30 | 46 | 46 |
| Crystallite diameter {020}_BS2 (nm) | 69 | 46 | 54 | 41 | 51 |

TABLE 4-continued

|  | Experimental Example 7 | Experimental Example 8 | Experimental Example 9 | Experimental Example 10 | Experimental Example. 11 |
|---|---|---|---|---|---|
| Crystallite diameter {002}_BS2 (nm) | 117 | 59 | 71 | 66 | 56 |
| Distortion {400}_BS2 (—) | 0.009 | 0.007 | 0.011 | 0.008 | 0.007 |
| Distortion {020}_BS2 (—) | 0.006 | 0.009 | 0.008 | 0.010 | 0.008 |
| Distortion {002}_BS2 (—) | 0.010 | 0.021 | 0.017 | 0.019 | 0.022 |
| Precipitated crystal (2) | $Ba_2Si_4O_{10}$ | $Ba_2Si_4O_{10}$ | $Ba_2Si_4O_{10}$ | $Ba_2Si_4O_{10}$ | $Ba_2Si_4O_{10}$ |
| Crystallinity (wt %) | 22 | 18 | 22 | 16 | 3.9 |
| Axis length a (Å) | 23.20 | 23.21 | 23.18 | 23.21 | 23.20 |
| Axis length b (Å) | 4.68 | 4.67 | 4.67 | 4.68 | 4.67 |
| Axis length c (Å) | 13.61 | 13.61 | 13.60 | 13.61 | 13.58 |
| Axis angle α (degree) | 90 | 90 | 90 | 90 | 90 |
| Axis angle γ (degree) | 97.6 | 97.6 | 97.5 | 97.6 | 97.6 |
| Axis angle β (degree) | 90 | 90 | 90 | 90 | 90 |
| Crystallite diameter {400}_B2S4 (nm) | 48 | 42 | 47 | 46 | 43 |
| Crystallite diameter {020}_B2S4 (nm) | 40 | 36 | 40 | 36 | 38 |
| Crystallite diameter {002}_B2S4 (nm) | 49 | 44 | 50 | 47 | 145 |
| Distortion {400}_B2S4 (—) | 0.021 | 0.024 | 0.022 | 0.023 | 0.024 |
| Distortion {020}_B2S4 (—) | 0.011 | 0.012 | 0.010 | 0.012 | 0.011 |
| Distortion {002}_B2S4 (—) | 0.025 | 0028 | 0.024 | 0.026 | 0.008 |
| Crystallinity (BS2 + B2S4) (wt %) | 25 | 28 | 26 | 21 | 20 |
| Sum of distortion values (BS2 + B2S4) (—) | 0.082 | 0.101 | 0.093 | 0.097 | 0.081 |
| Lattice distortion {020} × crystallinity (BS2 + B2S4) (wt %) | 0.0025 | 0.0030 | 0.0026 | 0.0024 | 0.0018 |
| Lattice distortion {002} × crystallinity (BS2 + B2S4) (wt %) | 0.0057 | 0.0071 | 0.0059 | 0.0051 | 0.0038 |
| Sum of squared difference of lattice constant (Å$^2$) | 0.007 | 0.001 | 0.002 | 0.002 | 0.002 |
| Sum of (lattice distortion × crystallinity) | 0.013 | 0.015 | 0.014 | 0.012 | 0.008 |

TABLE 5

|  | Experimental Example 12 | Experimental Example 13 | Experimental Example 14 | Experimental Example 15 | Experimental Example 16 | Experimental Example 17 |
|---|---|---|---|---|---|---|
| Glass | F | F | F | F | F | F |
| 1st step heat treatment temperature (° C.) | 770 | 610 | 610 | 665 | 665 | 665 |
| Holding time (h) | 48 | 24 | 24 | 9 | 4 | 9 |
| Temperature increase/decrease rate (° C./min) | 5 | 5 | 5 | 5 | 5 | 5 |
| 2nd step heat treatment temperature (° C.) | ND | 745 | 770 | 745 | 745 | 745 |
| Holding time (h) | ND | 6 | 24 | 1 | 6 | 6 |
| Temperature increase/decrease rate (° C./min) | ND | 5 | 5 | 5 | 5 | 5 |
| Resonance frequency f (GHz) | 9.7 | 9.7 | 9.7 | 9.7 | 9.7 | 9.7 |
| Relative permittivity ε$_r$ (—) | 6.7 | 7.3 | 6.9 | 7.6 | 7.3 | 7.3 |
| Dielectric tangent tanδ (—) | 0.00045 | 0.00036 | 0.00042 | 0.00094 | 0.00047 | 0.00058 |
| Precipitated crystal (1) | $BaSi_2O_5$ | $BaSi_2O_5$ | $BaSi_2O_5$ | $BaSi_2O_5$ | $BaSi_2O_5$ | $BaSi_2O_5$ |
| Crystallinity (wt %) | 24 | 3 | ND | ND | 0 | 0 |
| Axis length a (Å) | 7.69 | 7.68 | ND | ND | — | — |
| Axis length b (Å) | 4.65 | 4.67 | ND | ND | — | — |
| Axis length c (Å) | 13.51 | 13.53 | ND | ND | — | — |
| Axis angle α (degree) | 90 | 90 | ND | ND | — | — |
| Axis angle γ (degree) | 90 | 90 | ND | ND | — | — |
| Axis angle β (degree) | 90 | 90 | ND | ND | — | — |
| Crystallite diameter {400}_BS2 (nm) | 51 | 35 | ND | ND | — | — |
| Crystallite diameter {020}_BS2 (nm) | 48 | 60 | ND | ND | — | — |
| Crystallite diameter {002}_BS2 (nm) | 58 | 94 | ND | ND | — | — |
| Distortion {400}_BS2 (—) | 0.007 | 0.010 | ND | ND | — | — |
| Distortion {020}_BS2 (—) | 0.009 | 0.007 | ND | ND | — | — |
| Distortion {002}_BS2 (—) | 0.021 | 0.013 | ND | ND | — | — |
| Precipitated crystal (2) | $Ba_2Si_4O_{10}$ | $Ba_2Si_4O_{10}$ | ND | ND | $Ba_2Si_4O_{10}$ | $Ba_2Si_4O_{10}$ |
| Crystallinity (wt %) | 6 | 20 | ND | ND | 27 | 20 |
| Axis length a (Å) | 23.27 | 23.19 | ND | ND | 23.19 | 23.19 |
| Axis length b (Å) | 4.64 | 4.67 | ND | ND | 4.68 | 4.68 |
| Axis length c (Å) | 13.56 | 13.60 | ND | ND | 13.61 | 13.61 |
| Axis angle α (degree) | 90 | 90 | ND | ND | 90 | 90 |
| Axis angle γ (degree) | 98.5 | 97.5 | ND | ND | 97.6 | 97.6 |
| Axis angle β (degree) | 90 | 90 | ND | ND | 90 | 90 |
| Crystallite diameter | 34 | 94 | ND | ND | 49 | 45 |

TABLE 5-continued

|  | Experimental Example 12 | Experimental Example 13 | Experimental Example 14 | Experimental Example 15 | Experimental Example 16 | Experimental Example 17 |
|---|---|---|---|---|---|---|
| Crystallite diameter {400}_B2S4 (nm) | 33 | 76 | ND | ND | 40 | 37 |
| Crystallite diameter {020}_B2S4 (nm) | 83 | 60 | ND | ND | 45 | 39 |
| Crystallite diameter {002}_B2S4 (nm) |  |  |  |  |  |  |
| Distortion {400}_B2S4 (—) | 0.031 | 0.013 | ND | ND | 0.021 | 0.023 |
| Distortion {020}_B2S4 (—) | 0.013 | 0.009 | ND | ND | 0.011 | 0.011 |
| Distortion {002}_B2S4 (—) | 0.015 | 0.007 | ND | ND | 0.027 | 0.031 |
| Crystallinity (BS2 + B2S4) (wt %) | 30 | 23 | ND | ND | 27 | 20 |
| Sum of distortion values (BS2 + B2S4) (—) | 0.095 | 0.059 | ND | ND | 0.058 | 0.066 |
| Lattice distortion {020} × crystallinity (BS2 + B2S4) (wt %) | 0.0028 | 0.0020 | ND | ND | 0.0029 | 0.0022 |
| Lattice distortion {002} × crystallinity (BS2 + B2S4) (wt %) | 0.0059 | 0.0018 | ND | ND | 0.0073 | 0.0061 |
| Sum of squared difference of lattice constant (Å$^2$) | 0.059 | 0.002 | ND | ND | 0.0003 | 0.0005 |
| Sum of (lattice distortion × crystallinity) | 0.012 | 0.004 | ND | ND | 0.016 | 0.013 |

TABLE 6

|  | Experimental Example 18 | Experimental Example 19 | Experimental Example 20 | Experimental Example 21 | Experimental Example 22 |
|---|---|---|---|---|---|
| Glass | F | F | F | F | F |
| 1st step heat treatment temperature (° C.) | 665 | 665 | 720 | 745 | 770 |
| Holding time (h) | 24 | 24 | 6 | 6 | 6 |
| Temperature increase/decrease rate (° C./min) | 5 | 5 | 10 | 10 | 10 |
| 2nd step heat treatment temperature (° C.) | 745 | 770 | ND | ND | ND |
| Holding time (h) | 6 | 6 | ND | ND | ND |
| Temperature increase/decrease rate (° C./min) | 5 | 5 | ND | ND | ND |
| Resonance frequency f (GHz) | 9.7 | 9.7 | 9.7 | 9.7 | 9.7 |
| Relative permittivity $\varepsilon_r$ (—) | 8.0 | 7.8 | 6.8 | 6.8 | 6.8 |
| Dielectric tangent tan$\delta$ (—) | 0.00125 | 0.0006 | 0.0004 | 0.0004 | 0.0004 |
| Precipitated crystal (1) | $BaSi_2O_5$ | $BaSi_2O_5$ | $BaSi_2O_5$ | $BaSi_2O_5$ | $BaSi_2O_5$ |
| Crystallinity (wt %) | 10 | ND | ND | ND | ND |
| Axis length a (Å) | 7.66 | ND | ND | ND | ND |
| Axis length b (Å) | 4.68 | ND | ND | ND | ND |
| Axis length c (Å) | 13.67 | ND | ND | ND | ND |
| Axis angle α (degree) | 90 | ND | ND | ND | ND |
| Axis angle γ (degree) | 90 | ND | ND | ND | ND |
| Axis angle β (degree) | 90 | ND | ND | ND | ND |
| Crystallite diameter {400}_BS2 (nm) | 31 | ND | ND | ND | ND |
| Crystallite diameter {020}_BS2 (nm) | 30 | ND | ND | ND | ND |
| Crystallite diameter {002}_BS2 (nm) | 57 | ND | ND | ND | ND |
| Distortion {400}_BS2 (—) | 0.011 | ND | ND | ND | ND |
| Distortion {020}_BS2 (—) | 0.014 | ND | ND | ND | ND |
| Distortion {002}_BS2 (—) | 0.022 | ND | ND | ND | ND |
| Precipitated crystal (2) | $Ba_2Si_4O_{10}$ | $Ba_2Si_4O_{10}$ | $Ba_2Si_4O_{10}$ | $Ba_2Si_4O_{10}$ | $Ba_2Si_4O_{10}$ |
| Crystallinity (wt %) | 25 | ND | ND | ND | ND |
| Axis length a (Å) | 23.20 | ND | ND | ND | ND |
| Axis length b (Å) | 4.69 | ND | ND | ND | ND |
| Axis length c (Å) | 13.64 | ND | ND | ND | ND |
| Axis angle α (degree) | 90 | ND | ND | ND | ND |
| Axis angle γ (degree) | 97.9 | ND | ND | ND | ND |
| Axis angle β (degree) | 90 | ND | ND | ND | ND |
| Crystallite diameter {400}_B2S4 (nm) | 42 | ND | ND | ND | ND |
| Crystallite diameter {020}_B2S4 (nm) | 25 | ND | ND | ND | ND |
| Crystallite diameter {002}_B2S4 (nm) | 30 | ND | ND | ND | ND |
| Distortion {400}_B2S4 (—) | 0.025 | ND | ND | ND | ND |
| Distortion {020}_B2S4 (—) | 0.017 | ND | ND | ND | ND |
| Distortion {002}_B2S4 (—) | 0.041 | ND | ND | ND | ND |
| Crystallinity (BS2 + B2S4) (wt %) | 35 | ND | ND | ND | ND |
| Sum of distortion values (BS2 + B2S4) (—) | 0.130 | ND | ND | ND | ND |

TABLE 6-continued

|  | Experimental Example 18 | Experimental Example 19 | Experimental Example 20 | Experimental Example 21 | Experimental Example 22 |
|---|---|---|---|---|---|
| Lattice distortion {020} × crystallinity (BS2 + B2S4) (wt %) | 0.0057 | ND | ND | ND | ND |
| Lattice distortion {002} × crystallinity (BS2 + B2S4) (wt %) | 0.0125 | ND | ND | ND | ND |
| Sum of squared difference of lattice constant (Å$^2$) | 0.024 | ND | ND | ND | ND |
| Sum of (lattice distortion × crystallinity) | 0.026 | ND | ND | ND | ND |

Experimental Examples 23-47

In Experimental Examples 23-47, experiments were carried out while changing the glass materials and the heat treatment method. Changes from Experimental Example 1 are summarized in Tables 7-10.

In Experimental Examples 23-36, experiments were carried out while changing the addition amount of Li$_2$O of the glass in a range of 0 to 5 mol % and changing the heat treatment conditions.

In Experimental Examples 37-46, experiments were carried out while changing the composition of addition components. In Experimental Examples 37-39, the addition amount of Na$_2$O was changed in a range of 0 to 2 mol %. In Experimental Examples 40-43, experiments were carried out while changing the addition amounts of K$_2$O, ZrO$_2$, and TiO$_2$ and the heat treatment conditions. In Experimental Examples 44-46, experiments were carried out while changing the addition amounts of Al$_2$O$_3$ and Li$_2$O and the heat treatment conditions.

Conditions and results of the above experiments are summarized in the following Tables 7-10.

TABLE 7

|  | Experimental Example 23 | Experimental Example 24 | Experimental Example 25 | Experimental Example 26 | Experimental Example. 27 | Experimental Example. 28 |
|---|---|---|---|---|---|---|
| Glass | A | A | B | B | B | C |
| Heat treatment temperature (° C.) | 860 | 890 | 860 | 860 | 910 | 845 |
| Holding time (h) | 24 | 24 | 6 | 24 | 24 | 24 |
| Temperature increase/decrease rate (° C./min) | 5 | 5 | 5 | 5 | 5 | 5 |
| Relative permittivity ε$_r$ (—) | 7.91 | 7.61 | 7.66 | 6.86 | 7.01 | 6.95 |
| Dielectric tangent tanδ (—) | 0.0029 | 0.00092 | 0.00082 | 0.00016 | 0.00015 | 0.00015 |
| Precipitated crystal (1) | BaSi$_2$O$_5$ | BaSi$_2$O$_5$ | BaSi$_2$O$_5$ | BaSi$_2$O$_5$ | BaSi$_2$O$_5$ | BaSi$_2$O$_5$ |
| Crystallinity (wt %) | ND | 0 | ND | 28.3 | 26.4 | ND |
| Axis length a (Å) | ND | — | ND | 7.69 | 7.69 | ND |
| Axis length b (Å) | ND | — | ND | 4.64 | 4.64 | ND |
| Axis length c (Å) | ND | — | ND | 13.52 | 13.52 | ND |
| Axis angle α (degree) | ND | — | ND | 90 | 90 | ND |
| Axis angle γ (degree) | ND | — | ND | 90 | 90 | ND |
| Axis angle β (degree) | ND | — | ND | 90 | 90 | ND |
| Crystallite diameter {400}_BS2 (nm) | ND | — | ND | 53 | 57 | ND |
| Crystallite diameter {020}_BS2 (nm) | ND | — | ND | 53 | 53 | ND |
| Crystallite diameter {002}_BS2 (nm) | ND | — | ND | 61 | 63 | ND |
| Distortion {400}_BS2 (—) | ND | — | ND | 0.0009 | 0.0006 | ND |
| Distortion {020}_BS2 (—) | ND | — | ND | 0.0029 | 0.0025 | ND |
| Distortion {002}_BS2 (—) | ND | — | ND | 0.0001 | 0.0000 | ND |
| Precipitated crystal (2) | Ba$_2$Si$_4$O$_{10}$ | Ba$_2$Si$_4$O$_{10}$ | Ba$_2$Si$_4$O$_{10}$ | Ba$_2$Si$_4$O$_{10}$ | Ba$_2$Si$_4$O$_{10}$ | Ba$_2$Si$_4$O$_{10}$ |
| Crystallinity (wt %) | ND | 18 | ND | 0 | 0 | ND |
| Axis length a (Å) | ND | 23.15 | ND | — | — | ND |
| Axis length b (Å) | ND | 4.68 | ND | — | — | ND |
| Axis length c (Å) | ND | 13.66 | ND | — | — | ND |
| Axis angle α (degree) | ND | 90 | ND | — | — | ND |
| Axis angle γ (degree) | ND | 97.89 | ND | — | — | ND |
| Axis angle β (degree) | ND | 90 | ND | — | — | ND |
| Crystallite diameter {400}_B2S4 (nm) | ND | 53 | ND | — | — | ND |
| Crystallite diameter {020}_B2S4 (nm) | ND | 24 | ND | — | — | ND |
| Crystallite diameter {002}_B2S4 (nm) | ND | 35 | ND | — | — | ND |
| Distortion {400}_B2S4 (—) | ND | 0.019 | ND | — | — | ND |
| Distortion {020}_B2S4 (—) | ND | 0.017 | ND | — | — | ND |
| Distortion {002}_B2S4 (—) | ND | 0.034 | ND | — | — | ND |
| Crystallinity (BS2 + B2S4) (wt %) | ND | 18 | ND | 28 | 26.4 | ND |
| Lattice distortion {020} × | ND | 0.0032 | ND | 0.0008 | 0.0006 | ND |

TABLE 7-continued

|  | Experimental Example 23 | Experimental Example 24 | Experimental Example 25 | Experimental Example 26 | Experimental Example. 27 | Experimental Example. 28 |
|---|---|---|---|---|---|---|
| crystallinity (BS2 + B2S4) (wt %) |  |  |  |  |  |  |
| Lattice distortion {002} × crystallinity (BS2 + B2S4) (wt %) | ND | 0.0063 | ND | 0.0008 | 0.0006 | ND |
| Sum of squared difference of lattice constant (Å$^2$) | ND | 0.00505 | ND | 0.00023 | 0.00020 | ND |
| Sum of (lattice distortion × crystallinity) | ND | 0.0130 | ND | 0.002 | 0.001 | ND |
| Precipitated crystal (3) | None | None | None | None | SiO$_2$ | None |
| Crystallinity (wt %) | ND | ND | ND | ND | 2.4 | ND |
| Crystallinity (all crystals) (wt %) | ND | 18 | ND | 28 | 28.8 | ND |

TABLE 8

|  | Experimental Example 29 | Experimental Example 30 | Experimental Example 31 | Experimental Example 32 | Experimental Example 33 |
|---|---|---|---|---|---|
| Glass | D | E | G | H | H |
| Heat treatment temperature (° C.) | 825 | 795 | 748 | 678 | 678 |
| Holding time (h) | 24 | 24 | 24 | 24 | 24 |
| Temperature increase/decrease rate (° C./min) | 5 | 5 | 5 | 5 | 10 |
| Relative permittivity ε$_r$ (—) | 6.76 | 6.91 | 6.61 | 7.52 | 7.35 |
| Dielectric tangent tanδ (—) | 0.00035 | 0.00036 | 0.00050 | 0.0020 | 0.0031 |
| Precipitated crystal (1) | BaSi$_2$O$_5$ | BaSi$_2$O$_5$ | BaSi$_2$O$_5$ | BaSi$_2$O$_5$ | BaSi$_2$O$_5$ |
| Crystallinity (wt %) | ND | 29 | 11 | 6 | 11 |
| Axis length a (Å) | ND | 7.68 | 7.68 | 7.68 | 7.67 |
| Axis length b (Å) | ND | 4.64 | 4.65 | 4.69 | 4.69 |
| Axis length c (Å) | ND | 13.50 | 13.52 | 13.65 | 13.65 |
| Axis angle α (degree) | ND | 90 | 90 | 90 | 90 |
| Axis angle γ (degree) | ND | 90 | 90 | 90 | 90 |
| Axis angle β (degree) | ND | 90 | 90 | 90 | 90 |
| Crystallite diameter {400}_BS2 (nm) | ND | 50 | 47 | 42 | 45 |
| Crystallite diameter {020}_BS2 (nm) | ND | 47 | 43 | 55 | 68 |
| Crystallite diameter {002}_BS2 (nm) | ND | 59 | 50 | 55 | 37 |
| Distortion {400}_BS2 (—) | ND | 0.0069 | 0.0074 | 0.0016 | 0.0021 |
| Distortion {020}_BS2 (—) | ND | 0.0088 | 0.0098 | 0.0032 | 0.0040 |
| Distortion {002}_BS2 (—) | ND | 0.0206 | 0.0246 | 0.0008 | 0.0010 |
| Precipitated crystal (2) | Ba$_2$Si$_4$O$_{10}$ | Ba$_2$Si$_4$O$_{10}$ | Ba$_2$Si$_4$O$_{10}$ | Ba$_2$Si$_4$O$_{10}$ | Ba$_2$Si$_4$O$_{10}$ |
| Crystallinity (wt %) | ND | 0 | 8 | 11 | 22 |
| Axis length a (Å) | ND | — | 23.21 | 23.29 | 23.26 |
| Axis length b (Å) | ND | — | 4.67 | 4.68 | 4.69 |
| Axis length c (Å) | ND | — | 13.60 | 13.65 | 13.64 |
| Axis angle α (degree) | ND | — | 90 | 90 | 90 |
| Axis angle γ (degree) | ND | — | 97.6 | 98.6 | 98.4 |
| Axis angle β (degree) | ND | — | 90 | 90 | 90 |
| Crystallite diameter {400}_B2S4 (nm) | ND | — | 60 | 36 | 32 |
| Crystallite diameter {020}_B2S4 (nm) | ND | — | 40 | 30 | 27 |
| Crystallite diameter {002}_B2S4 (nm) | ND | — | 55 | 43 | 70 |
| Distortion {400}_B2S4 (—) | ND | — | 0.017 | 0.001 | 0.001 |
| Distortion {020}_B2S4 (—) | ND | — | 0.011 | 0.005 | 0.005 |
| Distortion {002}_B2S4 (—) | ND | — | 0.022 | 0.001 | 0.000 |
| Crystallinity (BS2 + B2S4) (wt %) | ND | 29 | 20 | 17 | 33 |
| Lattice distortion {020} × crystallinity (BS2 + B2S4) (wt %) | ND | 0.0025 | 0.0020 | 0.0007 | 0.0015 |
| Lattice distortion {002} × crystallinity (BS2 + B2S4) (wt %) | ND | 0.0025 | 0.0030 | 0.0003 | 0.0005 |
| Sum of squared difference of lattice constant (Å$^2$) | ND | 0.00107 | 0.0010 | 0.0283 | 0.0238 |
| Sum of (lattice distortion × crystallinity) | ND | 0.007 | 0.007 | 0.001 | 0.002 |
| Precipitated crystal (3) | None | None | None | Li$_2$Si$_2$O$_5$ | Li$_2$Si$_2$O$_5$ |
| Crystallinity (wt %) | ND | ND | ND | 16.3 | 21.1 |
| Crystallinity (all crystals) (wt %) | ND | 29 | 20 | 33.4 | 54.2 |

TABLE 9

| | Experimental Example 34 | Experimental Example 35 | Experimental Example 36 | Experimental Example 37 | Experimental Example 38 | Experimental Example 39 | Experimental Example 40 | Experimental Example 41 |
|---|---|---|---|---|---|---|---|---|
| Glass | H | H | H | I | J | K | L | N |
| Heat treatment temperature (° C.) | 710 | 710 | 970 | 835 | 815 | 790 | 855 | 915 |
| Holding time (h) | 1 | 24 | 24 | 24 | 24 | 24 | 24 | 24 |
| Temperature increase/decrease rate (° C./min) | 5 | 5 | 5 | 5 | 5 | 5 | 5 | 5 |
| Relative permittivity $\varepsilon_r$ (—) | 7.32 | 7.18 | 6.30 | 6.92 | 6.96 | 7.05 | 6.98 | 7.69 |
| Dielectric tangent tan$\delta$ (—) | 0.0021 | 0.0005 | 0.0004 | 0.0005 | 0.0010 | 0.0019 | 0.0005 | 0.0022 |
| Precipitated crystal (1) | $BaSi_2O_5$ | $BaSi_2O_5$ | $BaSi_2O_5$ | $BaSi_2O_5$ | $BaSi_2O_5$ | $BaSi_2O_5$ | $BaSi_2O_5$ | $BaSi_2O_5$ |
| Crystallinity (wt %) | ND | 7 | ND | ND | ND | 37 | ND | 2 |
| Axis length a (Å) | ND | 7.68 | ND | ND | ND | 7.69 | ND | 7.70 |
| Axis length b (Å) | ND | 4.65 | ND | ND | ND | 4.64 | ND | 4.68 |
| Axis length c (Å) | ND | 13.54 | ND | ND | ND | 13.51 | ND | 13.54 |
| Axis angle $\alpha$ (degree) | ND | 90 | ND | ND | ND | 90 | ND | 90 |
| Axis angle $\gamma$ (degree) | ND | 90 | ND | ND | ND | 90 | ND | 90 |
| Axis angle $\beta$ (degree) | ND | 90 | ND | ND | ND | 90 | ND | 90 |
| Crystallite diameter {400}_BS2 (nm) | ND | 49 | ND | ND | ND | 57 | ND | 38 |
| Crystallite diameter {020}_BS2 (nm) | ND | 48 | ND | ND | ND | 52 | ND | 88 |
| Crystallite diameter {002}_BS2 (nm) | ND | 55 | ND | ND | ND | 62 | ND | 53 |
| Distortion {400}_BS2 (—) | ND | 0.002 | ND | ND | ND | 0.006 | ND | 0.009 |
| Distortion {020}_BS2 (—) | ND | 0.005 | ND | ND | ND | 0.008 | ND | 0.005 |
| Distortion {002}_BS2 (—) | ND | 0.001 | ND | ND | ND | 0.010 | ND | 0.011 |
| Precipitated crystal (2) | $Ba_2Si_4O_{10}$ | $Ba_2Si_4O_{10}$ | $Ba_2Si_4O_{10}$ | $Ba_2Si_4O_{10}$ | $Ba_2Si_4O_{10}$ | $Ba_2Si_4O_{10}$ | $Ba_2Si_4O_{10}$ | $Ba_2Si_4O_{10}$ |
| Crystallinity (wt %) | ND | 12 | ND | ND | ND | 0 | ND | 30 |
| Axis length a (Å) | ND | 23.20 | ND | ND | ND | — | ND | 23.24 |
| Axis length b (Å) | ND | 4.68 | ND | ND | ND | — | ND | 4.69 |
| Axis length c (Å) | ND | 13.62 | ND | ND | ND | — | ND | 13.62 |
| Axis angle $\alpha$ (degree) | ND | 90 | ND | ND | ND | — | ND | 90 |
| Axis angle $\gamma$ (degree) | ND | 97.7 | ND | ND | ND | — | ND | 97.5 |
| Axis angle $\beta$ (degree) | ND | 90 | ND | ND | ND | — | ND | 90 |
| Crystallite diameter {400}_B2S4 (nm) | ND | 35 | ND | ND | ND | — | ND | 43 |
| Crystallite diameter {020}_B2S4 (nm) | ND | 30 | ND | ND | ND | — | ND | 37 |
| Crystallite diameter {002}_B2S4 (nm) | ND | 41 | ND | ND | ND | — | ND | 45 |
| Distortion {400}_B2S4 (—) | ND | 0.001 | ND | ND | ND | — | ND | 0.024 |
| Distortion {020}_B2S4 (—) | ND | 0.004 | ND | ND | ND | — | ND | 0.012 |
| Distortion {002}_B2S4 (—) | ND | 0.000 | ND | ND | ND | — | ND | 0.027 |
| Crystallinity (BS2 + B2S4) (wt %) | ND | 19 | ND | ND | ND | 37 | ND | 32 |
| Lattice distortion {020} × crystallinity (BS2 + B2S4) (wt %) | ND | 0.0008 | ND | ND | ND | 0.003 | ND | 0.0035 |
| Lattice distortion {002} × crystallinity (BS2 + B2S4) (wt %) | ND | 0.0003 | ND | ND | ND | 0.003 | ND | 0.0080 |
| Sum of squared difference of lattice constant (Å$^2$) | ND | 0.00108 | ND | ND | ND | 0.00065 | ND | 0.00567 |
| Sum of (lattice distortion × crystallinity) | ND | 0.001 | ND | ND | ND | 0.008 | ND | 0.019 |
| Precipitated crystal (3) | None | $Li_2Si_2O_5$ | $Li_2Si_2O_3$ | None | None | None | $K_2Ba_7Si_{16}O_{40}$ | None |
| Crystallinity (wt %) | ND | 1.6 | ND | ND | ND | ND | ND | ND |
| Crystallinity (all crystals) (wt %) | ND | 20.6 | ND | ND | ND | 37 | ND | 32 |

TABLE 10

| | Experimental Example 42 | Experimental Example 43 | Experimental Example 44 | Experimental Example 45 | Experimental Example 46 | Experimental Example 47 |
|---|---|---|---|---|---|---|
| Glass | O | P | Q | R | S | T |
| Heat treatment temperature (° C.) | 970 | 950 | 815 | 855 | 843 | 740 |
| Holding time (h) | 24 | 24 | 24 | 24 | 24 | 24 |
| Temperature increase/decrease rate (° C./min) | 5 | 5 | 5 | 5 | 5 | 5 |
| Relative permittivity $\varepsilon_r$ (—) | 7.93 | 7.34 | 7.15 | 7.23 | 8.26 | 7.40 |
| Dielectric tangent tan$\delta$ (—) | 0.0012 | 0.0005 | 0.0020 | 0.0015 | 0.0043 | 0.0005 |
| Precipitated crystal (1) | $BaSi_2O_5$ | $BaSi_2O_5$ | $BaSi_2O_5$ | $BaSi_2O_5$ | $BaSi_2O_5$ | $BaSi_2O_5$ |
| Crystallinity (wt %) | 0 | 0 | ND | ND | ND | 15 |

TABLE 10-continued

| | Experimental Example 42 | Experimental Example 43 | Experimental Example 44 | Experimental Example 45 | Experimental Example 46 | Experimental Example 47 |
|---|---|---|---|---|---|---|
| Axis length a (Å) | — | — | ND | ND | ND | 7.68 |
| Axis length b (Å) | — | — | ND | ND | ND | 4.65 |
| Axis length c (Å) | — | — | ND | ND | ND | 13.52 |
| Axis angle α (degree) | — | — | ND | ND | ND | 90 |
| Axis angle γ (degree) | — | — | ND | ND | ND | 90 |
| Axis angle β (degree) | — | — | ND | ND | ND | 90 |
| Crystallite diameter {400}_BS2 (nm) | — | — | ND | ND | ND | 42 |
| Crystallite diameter {020}_BS2 (nm) | — | — | ND | ND | ND | 46 |
| Crystallite diameter {002}_BS2 (nm) | — | — | ND | ND | ND | 50 |
| Distortion {400}_BS2 (—) | — | — | ND | ND | ND | 0.008 |
| Distortion {020}_BS2 (—) | — | — | ND | ND | ND | 0.009 |
| Distortion {002}_BS2 (—) | — | — | ND | ND | ND | 0.024 |
| Precipitated crystal (2) | $Ba_2Si_4O_{10}$ | $Ba_2Si_4O_{10}$ | $Ba_2Si_4O_{10}$ | $Ba_2Si_4O_{10}$ | $Ba_2Si_4O_{10}$ | $Ba_2Si_4O_{10}$ |
| Crystallinity (wt %) | 32 | 21 | ND | ND | ND | 5 |
| Axis length a (Å) | 23.19 | 23.21 | ND | ND | ND | 23.20 |
| Axis length b (Å) | 4.69 | 4.69 | ND | ND | ND | 4.67 |
| Axis length c (Å) | 13.64 | 13.63 | ND | ND | ND | 13.60 |
| Axis angle α (degree) | 90 | 90 | ND | ND | ND | 90 |
| Axis angle γ (degree) | 97.9 | 97.7 | ND | ND | ND | 97.6 |
| Axis angle β (degree) | 90 | 90 | ND | ND | ND | 90 |
| Crystallite diameter {400}_B2S4 (nm) | 48 | 46 | ND | ND | ND | 48 |
| Crystallite diameter {020}_B2S4 (nm) | 31 | 34 | ND | ND | ND | 38 |
| Crystallite diameter {002}_B2S4 (nm) | 42 | 36 | ND | ND | ND | 62 |
| Distortion {400}_B2S4 (—) | 0.022 | 0.022 | ND | ND | ND | 0.021 |
| Distortion {020}_B2S4 (—) | 0.014 | 0.012 | ND | ND | ND | 0.011 |
| Distortion {002}_B2S4 (—) | 0.029 | 0.033 | ND | ND | ND | 0.020 |
| Crystallinity (BS2 + B2S4) (wt %) | 32 | 21 | ND | ND | ND | 20 |
| Lattice distortion {020} × crystallinity (BS2 + B2S4) (wt %) | 0.0043 | 0.0026 | ND | ND | ND | 0.0019 |
| Lattice distortion {002} × crystallinity (BS2 + B2S4) (wt %) | 0.0092 | 0.0071 | ND | ND | ND | 0.0023 |
| Sum of squared difference of lattice constant (Å$^2$) | 0.00180 | 0.00146 | ND | ND | ND | 0.00085 |
| Sum of (lattice distortion × crystallinity) | 0.020 | 0.015 | ND | ND | ND | 0.006 |
| Precipitated crystal (3) | None | None | None | None | None | None |
| Crystallinity (wt %) | ND | ND | ND | ND | ND | ND |
| Crystallinity (all crystals) (wt %) | 32 | 21 | ND | ND | ND | 20 |

FIG. 1 is a plot of a relationship between the sum of $BaSi_2O_5$ crystallinity and $Ba_2Si_4O_{10}$ crystallinity and the dielectric tangent tan δ. To show influence of the $BaSi_2O_5$ crystallinity and the $Ba_2Si_4O_{10}$ crystallinity, samples (Experimental Examples 32-36) having a composition H in which Li-based crystals occurred are omitted. As seen from FIG. 1, the sum of $BaSi_2O_5$ crystallinity and $Ba_2Si_4O_{10}$ crystallinity was 15 to 50 wt % and the dielectric tangent tan δ was 0.030 or smaller. Furthermore, in samples in which the crystallinity was 31% or smaller, the dielectric tangent tan δ was 0.010 or smaller.

Figure 2:
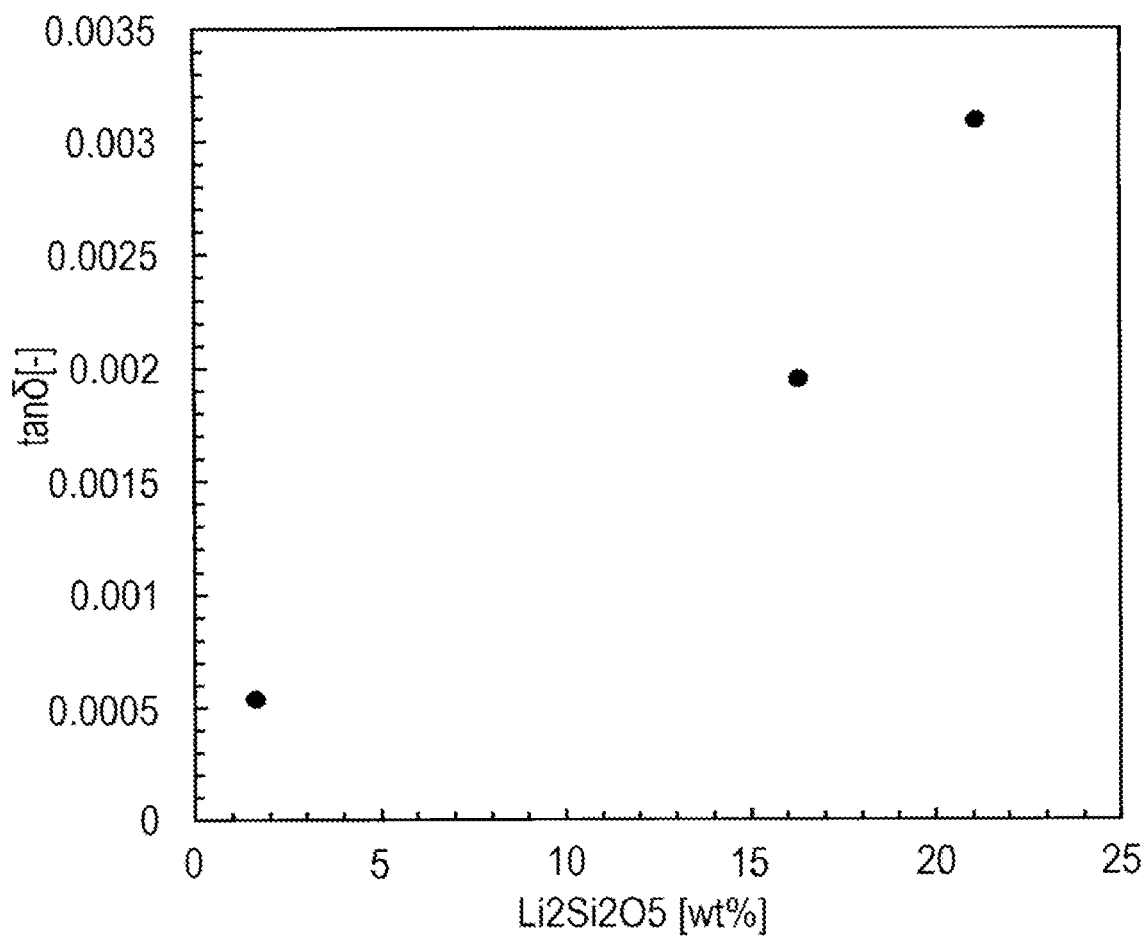
FIG. 2 is a graph showing a relationship between the $Li_2Si_2O_5$ crystallinity and the dielectric tangent tan δ that were obtained in Experimental Examples having a composition H.

Li-based crystals $Li_2Si_2O_5$ was precipitated in part of Experimental Examples 32-36 that used composition H in which $Li_2O$ was contained at 5 mol %. FIG. 2 is a plot of a relationship between the $Li_2Si_2O_5$ crystallinity and the dielectric tangent tan δ in the case of composition H. As shown in FIG. 2, a tendency was found that the dielectric tangent tan δ increased as the amount of $Li_2Si_2O_5$ crystals increased. For example, in samples in which $Li_2Si_2O_5$ crystals were precipitated, the dielectric tangent tan δ was larger than in other samples in which the sum of $BaSi_2O_5$ crystallinity and $Ba_2Si_4O_{10}$ crystallinity was at the same level and no Li-based crystals were precipitated. Thus, in the case where $Li_2O$ is added, it is preferable to execute the crystallizing step so that no Li-based crystals is precipitated.

Figure 3:
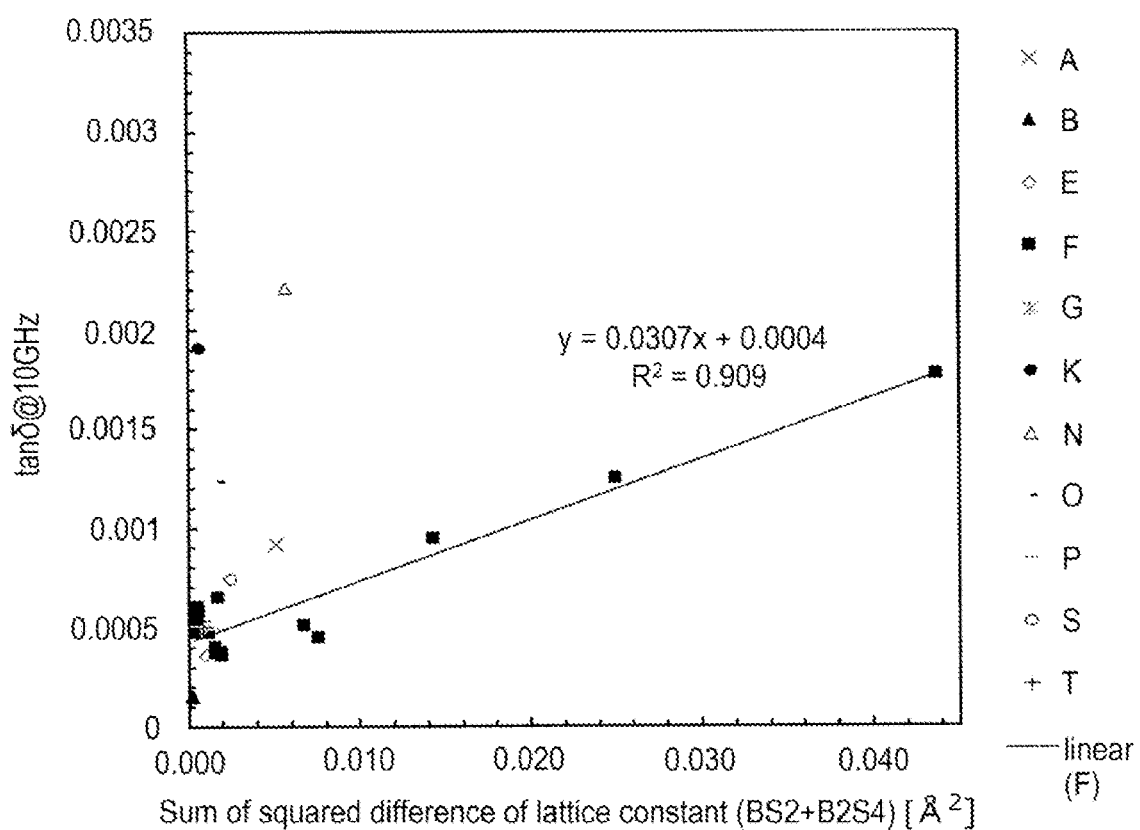
FIG. 3 is a graph showing a relationship between the sum of squared difference of lattice constant of $BaSi_2O_5$ and $Ba_2Si_4O_{10}$ and the dielectric tangent tan δ in Experimental Examples.

FIG. 3 is a plot of a relationship between the sum of squared difference of lattice constant in the above-described criterion 1 and the dielectric tangent tan δ. It is noted that to eliminate influence of Li-based crystals, results of the samples (Experimental Examples 32-36) having the composition H were not plotted. The straight line in FIG. 3 indicates an approximation straight line of samples having a composition F. It is seen from FIG. 3 that the distortion of crystal structure is suppressed and the dielectric tangent tan δ can thereby be made smaller as the sum of squared difference of lattice constant decreases. In particular, the dielectric tangent tan δ was 0.0010 or smaller when the sum of squared difference of lattice constant was 0.025 or smaller. In addition, it is seen that in the composition F, the sum of squared difference of lattice constant and the dielectric tangent tan δ have a linear relationship. Thus, it is considered that only crystalline phases of $BaSi_2O_5$ and $Ba_2Si_4O_{10}$ were precipitated selectively in the samples having the composition F.

Figure 4:
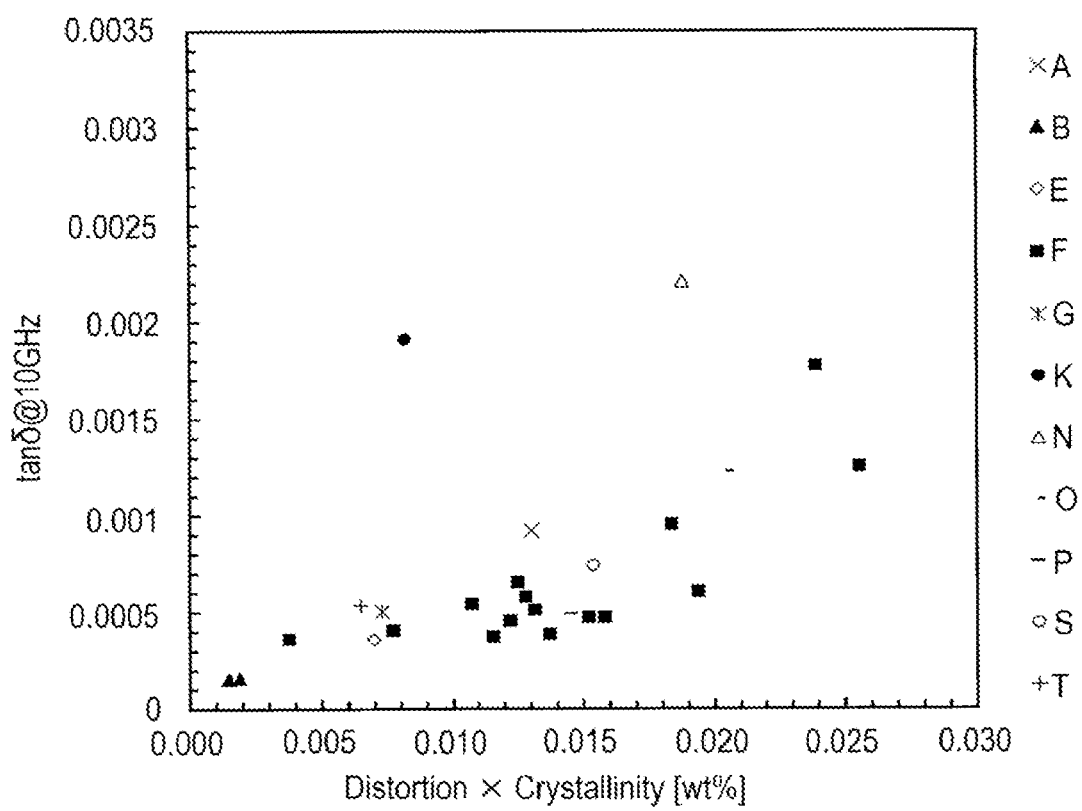
FIG. 4 is a graph showing a relationship between the sum of a total value of crystallinity and distortion values in each plane of a {400} plane, a {020} plane, and a {002} plane of $BaSi_2O_5$ and $Ba_2Si_4O_{10}$ in criterion 2 and the dielectric tangent tan δ of crystallized glass.

FIG. 4 is a plot of a relationship between the sum (sum of (crystallinity distortion)) in criterion 2 of a total value of the products of $BaSi_2O_5$ crystallinity and distortion values in each plane of the {002} plane, the {020} plane, and the {400} plane of $BaSi_2O_5$ and a total value of the products of $Ba_2Si_4O_{10}$ crystallinity and distortion values in each plane of the {002} plane, the {020} plane, and the {400} plane of $Ba_2Si_4O_{10}$ and the dielectric tangent tan δ of the crystallized glass. It is seen that the dielectric tangent tan δ can be reduced meaningfully by decreasing the sum of (crystallinity×distortion) which indicates a total amount of distortions in the crystallized glass. In particular, the dielectric tangent tan δ was 0.010 or smaller when the sum of (crystallinity×distortion) was 0.019 or smaller.

In FIGS. 3 and 4, the dielectric tangent tan δ was larger relative to a measured distortion value in the Experimental Example 39 that used a composition K in which $Na_2O$ was contained at 2 wt % and Experimental Example 41 that used a composition N in which $Ti_2O$ was contained at 2 wt %. This is considered because the dielectric tangent tan δ increased in the reason that $Na_2O$ or $Ti_2O$ contributed to increase of the dielectric tangent of the glass.

Although the invention has been described in detail by referring to the particular embodiment, it is apparent to those skilled in the art that various changes and modifications are possible without departing from the spirit and scope of the invention. The present application is based on Japanese Patent Application No. 2020-060908 filed on Mar. 30, 2020, the disclosure of which is incorporated herein by reference.

The invention claimed is:

1. A crystallized glass, comprising:
a glass having a crystalline phase consisting of Ba—Si—O,
wherein
the crystallized glass comprises Li, and a crystallinity of Li-based crystals contained in the crystalline phase is 20% or lower as represented by weight %, and
the crystalline phase comprises at least one of $BaSi_2O_5$ and $Ba_2Si_4O_{10}$, wherein a sum of a crystallinity of $BaSi_2O_5$ and a crystallinity of $Ba_2Si_4O_{10}$ is from 15 to 45% as represented by weight %.

2. The crystallized glass according to claim 1, wherein a sum of a squared difference of lattice constant is 0.050 or less, wherein the sum of squared difference of lattice constant is given by the following equation:

(sum of squared difference of lattice constant)=
$(A_{BS2}-A'_{BS2})^2+(B_{BS2}-B'_{BS2})^2+(C_{BS2}-C'_{BS2})^2+$
$(A_{B2S4}-A'_{B2S4})^2+(B_{B2S4}-B'_{B2S4})^2+(C_{B2S4}-C'_{B2S4})^2$, where $A_{BS2}$, $B_{BS2}$, and $C_{BS2}$ are lattice constants of $BaSi_2O_5$ measured in the crystalline phase, $A_{B2S4}$, $B_{B2S4}$, and $C_{B2S4}$ are lattice constants of $Ba_2Si_4O_{10}$ measured in the crystalline phase, $A'_{BS2}$, $B'_{BS2}$, and $C'_{BS2}$ are lattice constants of $BaSi_2O_5$ in an ideal crystalline state disclosed in ICSD Collection Code: 15486, and $A'_{B2S4}$, $B'_{B2S4}$, and $C'_{B2S4}$ are lattice constants of $Ba_2Si_4O_{10}$ in an ideal crystalline state disclosed in ICSD Collection Code: 9339.

3. The crystallized glass according to claim 1, wherein a sum of a total value of products of $BaSi_2O_5$ crystallinity and distortion values in each plane of a {400} plane, a {020} plane, and a {002} plane of $BaSi_2O_5$, and a total value of products of $Ba_2Si_4O_{10}$ crystallinity and distortion values in each plane of a {400} plane, a {020} plane, and a {002} plane of $Ba_2Si_4O_{10}$, is 0.030 or smaller.

4. The crystallized glass according to claim 1, wherein the crystallized glass has a composition α wherein a sum of a squared difference of lattice constant and a dielectric tangent at 10 GHz have a linear relationship determined by the following test method:
(i) preparing plural kinds of amorphous glass having the composition α and producing plural samples under different crystallization conditions;
(ii) measuring a dielectric tangent at 10 GHz of each of the samples;
(iii) in each of the samples, measuring lattice constants $A_{BS2}$, $B_{BS2}$, and $C_{BS2}$ of $BaSi_2O_5$ in the crystalline phase and $A_{B2S4}$, $B_{B2S4}$, and $C_{B2S4}$ of $Ba_2Si_4O_{10}$ in the crystalline phase;
(iv) for each of the samples, determining a sum of squared difference of lattice constant according to the following equation:

(sum of squared difference of lattice constant)=
$(A_{BS2}-A'_{BS2})^2+(B_{BS2}-B'_{BS2})^2+(C_{BS2}-C'_{BS2})^2+$
$(A_{B2S4}-A'_{B2S4})^2+(B_{B2S4}-B'_{B2S4})^2+(C_{B2S4}-C'_{B2S4})^2$, where $A'_{BS2}$, $B'_{BS2}$, and $C'_{BS2}$ are lattice constants of $BaSi_2O_5$ in an ideal crystalline state disclosed in ICSD Collection Code: 15486 and $A'_{B2S4}$, $B'_{B2S4}$, and $C'_{B2S4}$ are lattice constants of $Ba_2Si_4O_{10}$ in an ideal crystalline state disclosed in ICSD Collection Code: 9339; and
(v) determining a correlation between the sums of squared difference of lattice constant of the plural samples and dielectric tangents at 10 GHz of the plural samples.

5. The crystallized glass according to claim 4, wherein the linear relationship is given by the following formulae:

$Y=aX+b$, $a>0$, and $b<0.0030$, where X is the sum of squared difference of lattice constant, Y is the dielectric tangent at 10 GHz, and a and b are an arbitrary slope and intercept, respectively.

6. The crystallized glass according to claim 1, comprising, as represented by mol % based on oxides:
from 68% to 78% of $SiO_2$;
from 0% to 5% of $Al_2O_3$;
from 24% to 32% of BaO;
from higher than 0% to 6% of $Li_2O$;
from 0% to 3% of $Na_2O$;
from 0% to 3% of $K_2O$;
from 0% to 4% of $ZrO_2$;
from 0% to 4% of $TiO_2$; and
from higher than 0% to 6% of ($Li_2O+Na_2O+K_2O$).

7. The crystallized glass according to claim 4, wherein a $Li_2O$ content is from higher than 0% to 5%.

8. The crystallized glass according to claim 4, wherein a total content of $ZrO_2$ and $TiO_2$ is from higher than 0% to 5%.

9. A high-frequency substrate, comprising:
the crystallized glass according to claim 1.

10. The high-frequency substrate according to claim 9, having a dielectric tangent at 10 GHz of 0.0030 or smaller.

11. The high-frequency substrate according to claim 9, having a relative permittivity at 10 GHz of 6.0 to 8.0.

12. The high-frequency substrate according to claim 9, having a plate thickness of from 0.05 mm to 1 mm.

13. The high-frequency substrate according to claim 9, wherein the high-frequency substrate has two main surfaces that are opposite to each other, and an area of each main surface is 75 cm² or larger.

14. The high-frequency substrate according to claim 9, wherein the high-frequency substrate has two main surfaces that are opposed to each other and at least one of the main surfaces is formed with a hole having an opening.

15. A method for manufacturing a crystallized glass according to claim 1, the method comprising:
   melt-shaping a material containing $Li_2O$, BaO and $SiO_2$ to obtain an amorphous glass; and
   holding the amorphous glass at a treatment temperature of from 600° C. to less than 1,000° C. to crystallize the amorphous glass.

16. The manufacturing method according to claim 15, wherein the amorphous glass is held at the treatment temperature for 0.5 hour or longer.

17. The manufacturing method according to claim 15, wherein the treatment temperature is higher than or equal to a glass transition point Tg of the amorphous glass that is measured by a differential scanning calorimeter (DSC).

18. The manufacturing method according to claim 15, wherein the crystallization of the amorphous glass comprises a two-step heat treatment of holding the amorphous glass at a first treatment temperature from a glass transition point Tg to a crystallization start temperature Tx of the amorphous glass, that are measured by a differential scanning calorimeter (DSC) and subsequently holding the amorphous glass at a second treatment temperature of the crystallization start temperature Tx of the amorphous glass or higher, that is measured by a differential scanning calorimeter (DSC).

19. The crystallized glass according to claim 1, wherein the crystalline phase comprises both $BaSi_2O_5$ and $Ba_2Si_4O_{10}$.

\* \* \* \* \*